USO10025657B2

(12) United States Patent
Oku et al.

(10) Patent No.: US 10,025,657 B2
(45) Date of Patent: Jul. 17, 2018

(54) INFORMATION PROCESSING SYSTEM AND FAILURE DIAGNOSIS METHOD

(71) Applicants: Takenori Oku, Tokyo (JP); Hiroshi Nishida, Kanagawa (JP); Kentaro Seo, Tokyo (JP); Shunsuke Hayashi, Kanagawa (JP); Yusuke Shibata, Tokyo (JP); Yuuta Sano, Tokyo (JP); Satoshi Mizuno, Tokyo (JP); Takeyoshi Sekine, Tokyo (JP); Fumihiro Nagano, Kanagawa (JP); Satoshi Hatanaka, Kanagawa (JP); Kenji Ueda, Kanagawa (JP)

(72) Inventors: Takenori Oku, Tokyo (JP); Hiroshi Nishida, Kanagawa (JP); Kentaro Seo, Tokyo (JP); Shunsuke Hayashi, Kanagawa (JP); Yusuke Shibata, Tokyo (JP); Yuuta Sano, Tokyo (JP); Satoshi Mizuno, Tokyo (JP); Takeyoshi Sekine, Tokyo (JP); Fumihiro Nagano, Kanagawa (JP); Satoshi Hatanaka, Kanagawa (JP); Kenji Ueda, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/191,705

(22) Filed: Jun. 24, 2016

(65) Prior Publication Data
US 2016/0378584 A1 Dec. 29, 2016

(30) Foreign Application Priority Data

Jun. 29, 2015 (JP) .................. 2015-129737
Jul. 3, 2015 (JP) .................. 2015-134316

(51) Int. Cl.
*G06F 11/07* (2006.01)
*H04N 1/00* (2006.01)

(52) U.S. Cl.
CPC ........ *G06F 11/079* (2013.01); *G06F 11/0733* (2013.01); *G06F 11/0793* (2013.01);
(Continued)

(58) Field of Classification Search
None
See application file for complete search history.

(56) References Cited

U.S. PATENT DOCUMENTS

| 7,243,045 B2 | 7/2007 | Uwatoko et al. |
| 2011/0216359 A1 | 9/2011 | Kamisuwa et al. |

(Continued)

FOREIGN PATENT DOCUMENTS

| JP | 2004-037941 | 2/2004 |
| JP | 4538845 | 9/2010 |
| JP | 2011-181073 | 9/2011 |

Primary Examiner — Lennin Rodriguezgonzale
(74) Attorney, Agent, or Firm — IPUSA, PLLC

(57) ABSTRACT

An information processing system includes a storage unit that stores and associates a cause of a failure that has occurred in an electronic device, state information of the electronic device at the time the failure has occurred in the electronic device due to the cause of the failure, and a measure to be implemented in response to the cause of the failure. The information processing system further includes at least one processor that performs an acquisition process for acquiring the state information of the electronic device, and a failure diagnosis process for determining the cause of the failure that has occurred in the electronic device and the measure to be implemented in response to the cause of the failure based on the acquired state information of the electronic device.

14 Claims, 31 Drawing Sheets

(52) U.S. Cl.
CPC ..... *H04N 1/00015* (2013.01); *H04N 1/00029* (2013.01); *H04N 1/00039* (2013.01); *H04N 1/00061* (2013.01); *H04N 1/00079* (2013.01)

(56) References Cited

U.S. PATENT DOCUMENTS

| | | | |
|---|---|---|---|
| 2013/0065628 A1* | 3/2013 | Pfeffer | G08B 25/006 455/521 |
| 2013/0114100 A1* | 5/2013 | Torii | G06F 11/0733 358/1.14 |
| 2015/0249771 A1* | 9/2015 | Young | G06F 3/121 358/1.14 |

* cited by examiner

FIG.9

DIAGNOSIS RESULT NOTIFICATION SCREEN

CLIENT DEVICE INFORMATION  FAILURE DIAGNOSIS  DEVICE HISTORY  TRANSFER PAPER JAM
ORIGINAL DOCUMENT JAM  SC INFORMATION  PM PART INFORMATION  FIRMWARE INFORMATION  COUNTER INFORMATION

| DATA ACQUISITION DATE/TIME | 2014/09/16 17:33:32 | MODEL NAME (DEVICE) | XXXX | TOTAL COUNTER | 275,343 |
|---|---|---|---|---|---|
| COMMUNICATION DATE/TIME | 2014/09/16 17:33:59 | DEVICE NUMBER | 654321 | INSTALLATION DATE | 2012/09/21 |

<FAILURE DIAGNOSIS RESULT>

<ALL FAILURE DIAGNOSIS RESULTS>

| DIAGNOSIS DATE | TYPE | OPERATION INSTRUCTIONS (MEASURE) | DIAGNOSIS RESULT DETAILS |
|---|---|---|---|
| 2014/09/04 | MANUAL JAM-EM | PERFORM MANUAL PAPER FEEDING ROLLER REPLACEMENT, MANUAL SENSOR INSPECTION & CLEANING, AND USER INSTRUCTION ON MANUAL PAPER FEEDING. | DIAGNOSIS PERIOD: 2014/7/6~2014/9/4 MANUAL PAPER FEEDER JAM HAS OCCURRED 76 TIMES. WEAR/DIRT ON PAPER FEEDING ROLLER IS THE LIKELY CAUSE. |
| 2014/09/09 | MANUAL JAM-EM | PERFORM MANUAL PAPER FEEDING ROLLER REPLACEMENT, MANUAL SENSOR INSPECTION & CLEANING, AND USER INSTRUCTION ON MANUAL PAPER FEEDING. | DIAGNOSIS PERIOD: 2014/7/11~2014/9/9 MANUAL PAPER FEEDER JAM HAS OCCURRED 71 TIMES. WEAR/DIRT ON PAPER FEEDING ROLLER IS THE LIKELY CAUSE. |

| CURRENT POSITION | CE | PARTS | EXPERIENCE WITH FAILURE P | EXPERIENCE WITH FAILURE Q | EXPERIENCE WITH MAINTENANCE T | EXPERIENCE WITH MAINTENANCE U |
|---|---|---|---|---|---|---|
| TOKYO | A | X | 30 (20) | 20 | 10 | 50 |
| OSAKA | B | Y | 20 (5) | 4 | 4 | 20 |
| HOKKAIDO | C | NONE | 10 (10) | 50 | 2 | 10 |
| MIYAZAKI | D | X,Y | 5 (4) | 1 | 8 | 80 |
| AKITA | E | X,Y,Z | 0 (0) | 4 | 5 | 40 |
| .. | .. | .. | .. | .. | .. | .. |

FIG.18

| FAILURE NAME | FAILURE CAUSE | REQUIRED PART | ESTIMATED WORK TIME (h) | ... |
|---|---|---|---|---|
| FAILURE A | ... | PART A | 0.5 | ... |
| FAILURE B | ... | PART A, PART B | 1.0 | ... |
| FAILURE C | ... | PART C | 1.5 | ... |

FIG.19

| DEVICE ID | CLIENT NAME | LOCATION | DEVICE TYPE | ... |
|---|---|---|---|---|
| MFP001 | CLIENT A | $X_1, Y_1$ | ... | ... |
| MFP002 | CLIENT A | $X_2, Y_2$ | ... | ... |
| MFP003 | CLIENT B | $X_3, Y_3$ | ... | ... |

FIG.20

| CE ID | AFFILIATED SERVICE STATION | CURRENT POSITION | WORKING STATE | RANK | CE NAME | PHONE NUMBER |
|---|---|---|---|---|---|---|
| CE001 | TOKYO FIRST SS | x₁, y₁ | NO | A | ... | ... |
| CE002 | TOKYO FIRST SS | x₂, y₂ | NO | D | ... | ... |
| CE003 | OSAKA SS | x₃, y₃ | NO | B | ... | ... |
| CE004 | TOKYO SECOND SS | x₄, y₄ | NO | C | ... | ... |
| CE005 | TOKYO THIRD SS | x₅, y₅ | YES (1.0 h REMAINING) | A | ... | ... |

| RANK | SERVICEABLE FAILURES |
|---|---|
| A | FAILURE A, FAILURE B, FAILURE C, FAILURE D |
| B | FAILURE A, FAILURE B, FAILURE C |
| C | FAILURE A, FAILURE B |
| D | FAILURE A |

FIG.23

| DEVICE ID | CLIENT NAME | LOCATION | FAILURE NAME | FAILURE CAUSE | REQUIRED PART | ESTIMATED WORK TIME (h) |
|---|---|---|---|---|---|---|
| MFP001 | CLIENT A | $X_1, Y_1$ | FAILURE C | ... | PART C | 1.5 |

CE DISPATCH REQUEST

5001

| DEVICE ID | CLIENT NAME | FAILURE NAME | FAILURE CAUSE | ESTIMATED WORK TIME (h) |
|---|---|---|---|---|
| MFP001 | CLIENT A | FAILURE C | ... | 1.5 |

5002

PLEASE DISPATCH FOLLOWING CE

| CE ID | AFFILIATED SERVICE STATION | CE NAME | PHONE NUMBER |
|---|---|---|---|
| CE001 | TOKYO FIRST SS | ... | ... |

FIG.26A

| CE ID | AFFILIATED SERVICE STATION | CURRENT POSITION | WORKING STATE | RANK | CE NAME | PHONE NUMBER |
|---|---|---|---|---|---|---|
| CE001 | TOKYO FIRST SS | $x_1, y_1$ | NO | A | ... | ... |
| CE002 | TOKYO FIRST SS | $x_2, y_2$ | NO | D | ... | ... |
| CE004 | TOKYO SECOND SS | $x_4, y_4$ | NO | C | ... | ... |
| CE005 | TOKYO THIRD SS | $x_5, y_5$ | YES (1.0 h REMAINING) | A | ... | ... |

FIG.26B

| CE ID | AFFILIATED SERVICE STATION | CURRENT POSITION | WORKING STATE | RANK | CE NAME | PHONE NUMBER |
|---|---|---|---|---|---|---|
| CE001 | TOKYO FIRST SS | $x_1, y_1$ | NO | A | ... | ... |
| CE005 | TOKYO THIRD SS | $x_5, y_5$ | YES (1.0 h REMAINING) | A | ... | ... |

FIG.29

| PART NAME | CE WITH PART | SERVICE STATION WITH PART | PARTS CENTER INVENTORY |
|---|---|---|---|
| PART A | CE001, CE002, CE003, CE005 | TOKYO SECOND SS, TOKYO THIRD SS, OSAKA SS | NO |
| PART B | CE002, CE003, CE004, CE005 | TOKYO FIRST SS, TOKYO SECOND SS, TOKYO THIRD SS, OSAKA SS | YES |
| PART C | CE001, CE002, CE003 | TOKYO SECOND SS, TOKYO THIRD SS | YES |

FIG.33

| CLIENT NAME | GROUP |
|---|---|
| CLIENT A | GROUP A |
| CLIENT B | GROUP A |
| CLIENT C | GROUP B |

# INFORMATION PROCESSING SYSTEM AND FAILURE DIAGNOSIS METHOD

CROSS-REFERENCE TO RELATED APPLICATIONS

The present application claims priority under 35 U.S.C. § 119 to Japanese Patent Application No. 2015-129737 filed on Jun. 29, 2015 and Japanese Patent Application No. 2015-134316 filed on Jul. 3, 2015, the entire contents of which are incorporated herein by reference.

BACKGROUND OF THE INVENTION

1. Field of the Invention

The present disclosure relates to an information processing system and a failure diagnosis method.

2. Description of the Related Art

When a failure occurs in an electronic device, such as a copying machine or a printer, a service person such as a client engineer (hereinafter referred to as "CE") has to be dispatched to the site where the electronic device is located to perform necessary repairs. The CE typically examines the electronic device to determine the cause of failure and then performs the necessary repairs.

Techniques are known for automating failure diagnosis of a conveying apparatus or an image forming apparatus, for example, by generating a model similar to probabilistic information processing model representing the causality of failure in the apparatus and analyzing the cause of failure based on the model. Using such technique, the cause of failure, such as the specific location of the failure and specific details of the failure may be analyzed (see, e.g., Japanese Patent No. 4538845).

However, the time required to restore an electronic device that has failed may vary depending on the CE that is dispatched to the site of the electronic device, for example. That is, the time involved in properly determining the cause of failure and the time involved in determining the appropriate measures to be taken and then actually implementing these measures may vary depending on the specific failure that has occurred and the ability of the CE, for example.

Also, in the above-described technique that involves using a model representing the causality of failure of a device to perform failure diagnosis for identifying the cause of failure, such as the specific location of the failure and specific details of the failure, no analysis is conducted with respect to the appropriate measures to be implemented in responds to the specific cause of failure identified by the failure diagnosis.

Additionally, techniques are known for predicting failure of an electronic device such as an image forming apparatus and determining the timing of maintenance work, such as inspection or part replacement, to be implemented on the image forming apparatus based on the estimated extent of deterioration of parts and/or the estimated time of failure occurrence in the image forming apparatus, for example.

Further, techniques are known for generating a maintenance plan for an image forming apparatus based on the relationship between the expected service life of Consumable parts and the extent of use (operation) of the image forming apparatus, for example (see, e.g., Japanese Unexamined Patent Publication No. 2011-181073).

When a failure occurs or is expected to occur in an image forming apparatus that is subject to maintenance management, for example, a service person such as a CE has to be dispatched to the site of the image forming apparatus to perform repair work for fixing the failure or maintenance work for preventing the failure.

However, depending on the ability and experience of the CE, it may be difficult for the CE to perform certain repair work for fixing a failure that has occurred in an image forming apparatus, for example. Also, depending on the current location of the CE, it may take a long time for the CE to reach the site of the image forming apparatus, for example. Thus, it is difficult to determine the appropriate CE to be dispatched to the image forming apparatus.

SUMMARY OF THE INVENTION

According to one aspect of the present invention, an information processing system is provided that is capable of determining the cause of failure and the appropriate measure to be implemented in response to the cause of failure based on state information of an electronic device.

According to one embodiment of the present invention, an information processing system is provided that includes a storage unit that stores and associates a cause of a failure that has occurred in an electronic device, state information of the electronic device at the time the failure has occurred in the electronic device due to the cause of the failure, and a measure to be implemented in response to the cause of the failure. The information processing system further includes at least one processor that performs an acquisition process for acquiring the state information of the electronic device, and a failure diagnosis process for determining the cause of the failure that has occurred in the electronic device and the measure to be implemented in response to the cause of the failure based on the acquired state information of the electronic device.

BRIEF DESCRIPTION OF THE DRAWINGS

FIG. 9 is an example image of a diagnosis result notification screen;

FIG. 12 is a table illustrating an example of CE information;

FIG. 18 is a table illustrating an example of correspondence information;

FIG. 19 is a table illustrating an example of device information;

FIG. 20 is a table illustrating an example of CE information;

FIG. 23 is a table illustrating an example of failure information;

FIG. 24 is a diagram illustrating an example of a dispatch request screen;

FIGS. 26A and 26B are tables illustrating examples of extracted CE information and a further extraction of the extracted CE information;

FIG. 29 is a table illustrating an example of part information.

FIG. 33 is a table illustrating an example of client group information; and

DESCRIPTION OF THE EMBODIMENTS

In the following, embodiments of the present invention are described with reference to the accompanying drawings.

First Embodiment

<System Configuration>

Figure 1:
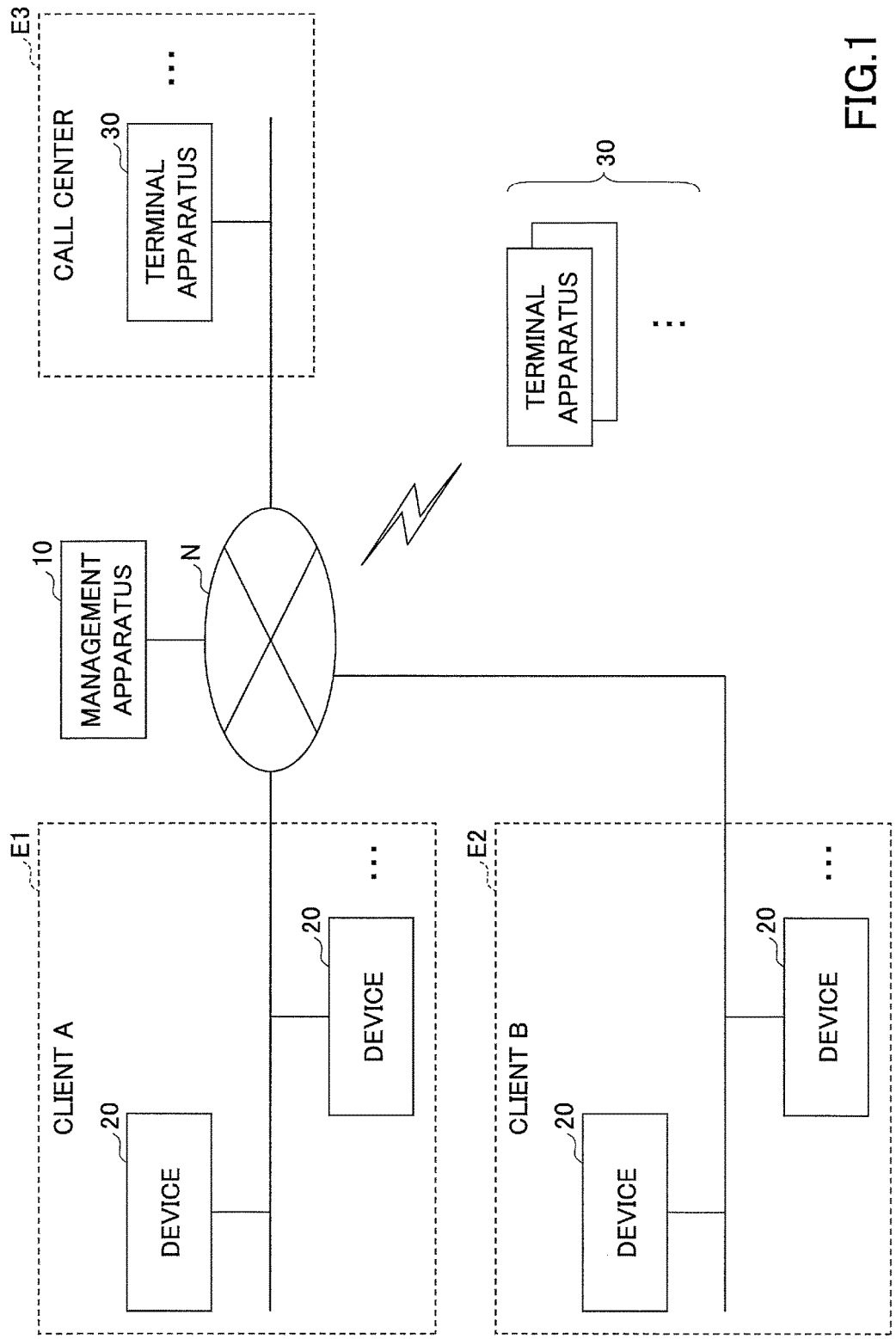
FIG. 1 is a diagram illustrating an example system configuration of a device management system according to a first embodiment of the present invention.

First, a device, management system according to a first embodiment of the present invention is described with reference to FIG. 1. FIG. 1 is a diagram illustrating a device management system as an example of an information processing system according to the first embodiment.

The device management system according to the first embodiment includes a management apparatus 10, a plurality of devices 20, and a plurality of terminal apparatuses 30 that are communicatively connected via a network N, such as the Internet or a telephone line network.

The management apparatus 10 acquires a plurality of variables related to the device 20 (e.g., state information such as a current output value of a sensor) via the network N1, for example.

Alternatively, the plurality of variables related to the device 20 may be recorded in a recording medium (e.g., USB memory) that has been loaded in the device 20 by a CE, for example, and the management apparatus 10 may read the plurality of variables related to the device 20 from the recording medium, for example.

Also, the management apparatus 10 stores a maintenance record of a CE (e.g., device number of the device 20, maintenance date, failure phenomenon, cause of failure, measure implemented, part replaced, and response time) as maintenance history information. The management apparatus 10 creates a failure diagnosis model as described below based on state information of the device 20 and the maintenance history information, and performs failure diagnosis based on the failure diagnosis model. The management apparatus 10 may notify a CE of the failure diagnosis result by displaying the failure diagnosis result on its own display, or displaying the failure diagnosis result on the terminal apparatus 30, for example.

Further, the management apparatus 10 predicts a failure that is likely to occur in the device 20. When a failure occurs or is expected to occur in the device 20, the management apparatus 10 determines a responder such as a CE that is to perform maintenance work or repair work, such as inspection or part replacement, for fixing the failure or preventing the occurrence of the failure in advance. At this time, the management apparatus 10 may determine the CE that is to perform the maintenance work or repair work based on information indicating the current position of a CE and/or information indicating the competence of the CE in performing maintenance work or repair work, for example.

After determining the specific CE that is to perform the maintenance work or repair work, the management apparatus 10 sends a dispatch request to the terminal apparatus 30 at the call center for dispatching the specific CE to the device 20.

Note that in the example of FIG. 1, the management apparatus 10 is configured by a single information processing apparatus (computer). However, the management apparatus 10 may also be configured by a plurality of information processing apparatuses, for example.

The device 20 may be an image forming apparatus, such as a multifunction peripheral (MFP) or a printer, that is installed in a client environment E1, such as the office of client A (as an example of a user), or a client environment E2, such as the office of client B, for example.

Note that in the following descriptions, it is assumed that the device 20 is an image forming apparatus, such as an MFP or a printer. However, the device 20 is not limited to such an image forming apparatus and may also be a projector, a digital whiteboard, a video conference terminal, a digital signage system, or some other type of electronic device.

The terminal apparatus 30 may be a terminal used by a CE that performs maintenance/repair work, such as repairs, inspection, or part replacement, on the device 20, for example. The terminal apparatus 30 may also be installed in a call center environment E3 of a call center operated by a leasing company or a seller of the devices 20, for example. The terminal apparatus 30 may be a PC (personal computer), a tablet terminal, a smartphone, or some other type of information processing apparatus, for example. The terminal apparatus 30 is configured to receive notification of a failure diagnosis result obtained using a failure diagnosis model and display the received failure diagnosis result.

The terminal apparatus 30 that is used by a CE may include a GPS (Global Positioning System) receiver so that it can measure its current position based on radio waves received from a GPS, for example. Note that such position information indicating the current position of the terminal apparatus 30 may be managed by the management apparatus 10 as position information indicating the current position of the CE using the terminal apparatus 30, for example.

The terminal apparatus 30 at the call center may be a PC used by an operator or a dispatcher that dispatches a CE to a device 20 and provides specific instructions to the CE, for example. Based on a dispatch request sent from the management apparatus 10 to the terminal apparatus 30 at the call center, the operator or the dispatcher may request a specific CE to go to the device 20 installed in the client environment E1 or the client environment E2 and perform maintenance work on the device 20, for example. Note that in the following descriptions, the operator or dispatcher is simply referred to as "operator".

In the device management system as illustrated in FIG. 1, when the occurrence of a failure in a device 20 is predicted, for example, the operator can dispatch an appropriate CE to the device 20. That is, in the device management system according to the present embodiment, when the occurrence of a failure in the device 20 is predicted, for example, a CE that is capable of handling the failure (capable of performing the necessary maintenance work) or a CE that is able to reach the device 20 in a short period of time may be determined and dispatched to the device 20.

<Hardware Configuration>

Figure 2:
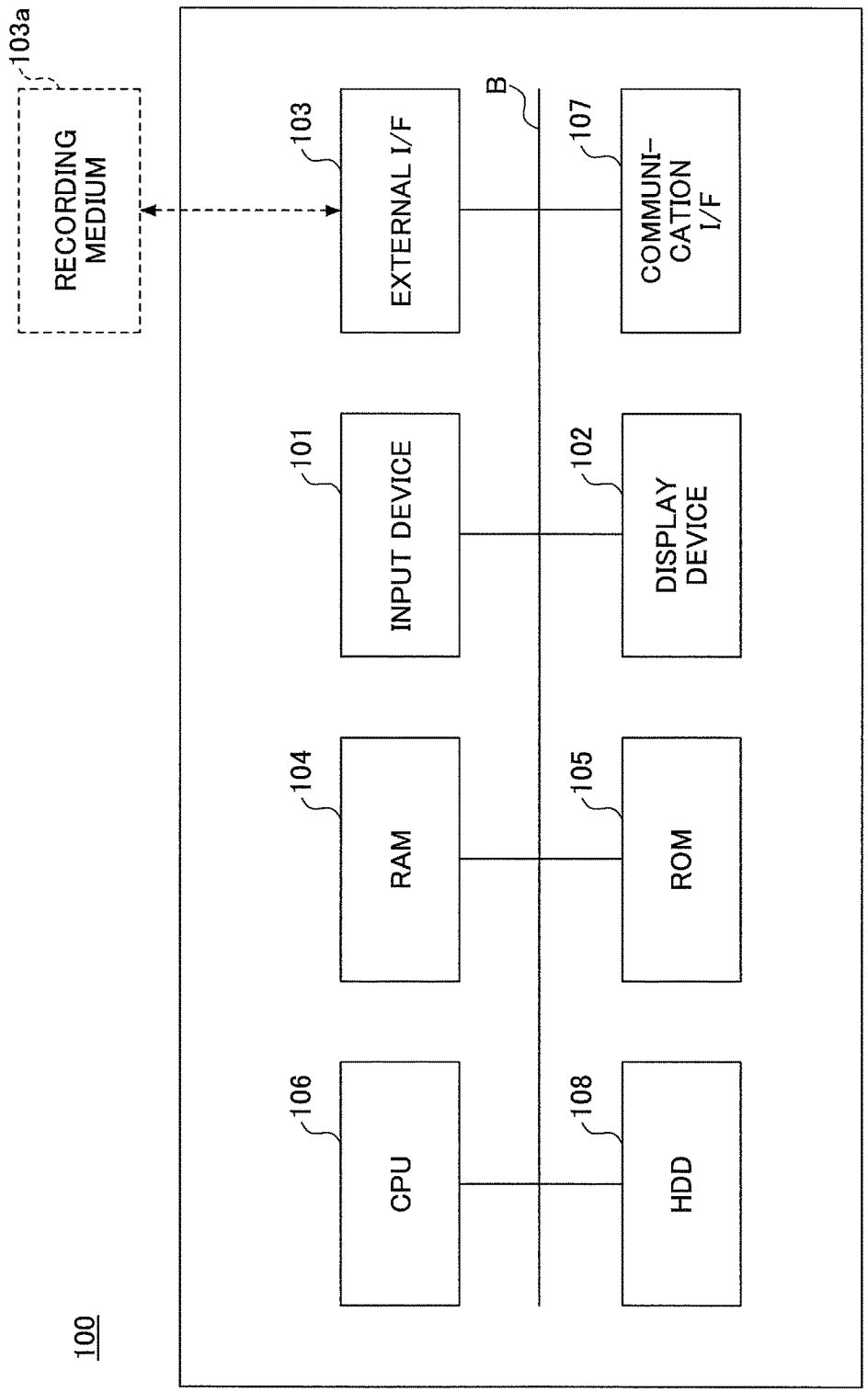
FIG. 2 is a block diagram illustrating an example hardware configuration of a computer according to the first embodiment.

Next, the hardware configuration of the management apparatus 10 and the terminal apparatus 30 is described with reference to FIG. 2. FIG. 2 is a diagram showing an example hardware configuration of a computer that implements the management apparatus 10 and the terminal apparatus 30 according to the present embodiment.

The computer 100 illustrated in FIG. 2 includes an input device 101, a display device 102, an external I/F (interface) 103, and a RAM (Random Access Memory) 104. Further, the computer 100 includes a ROM (Read Only Memory) 105, a CPU (Central Processing Unit) 106, a communication I/F 107, and a HDD (Hard Disk Drive) 108. The above hardware elements are connected to each other by a bus B.

The input device 101 may include a keyboard, a mouse, and/or a touch panel, for example, and is used for inputting various signals to the computer 100. The display device 102 may include a display for displaying various processing results, for example. Note that in some embodiments, the management apparatus 10 may have the input device 101 and/or the display device 102 connected to the bus B as necessary, for example.

The external I/F 103 is an interface with an external device. The external device may be a recording medium, such as a CD (Compact Disk), DVD (Digital Versatile Disk), an SD memory card, or a USB (Universal Serial Bus) memory, for example. The computer 100 may read and/or write data from/on the recording medium via the external I/F 103.

The RAM 104 is a volatile semiconductor memory (storage device) for temporarily storing programs and data. The ROM 105 is a nonvolatile semiconductor memory (storage device) that is capable of retaining data even when the power is turned off. The CPU 106 is a computing device that can perform various types of processes by loading programs and data stored in the HDD 108 or the ROM 105 into the RAM 104, for example.

The communication I/F 107 is an interface connecting the computer 100 to the network N. The HDD 108 is a nonvolatile memory (storage device) that stores programs and data. The programs and data stored in the HDD 108 may include a program for implementing processes of the present embodiment, an OS (Operating System) as basic software for controlling the entire computer 100, and various application programs running on the OS, for example. Note that in some embodiments, the computer 100 may include a nonvolatile memory (storage device), such as an SSD (Solid State Drive), in addition to or instead of the HDD 108, for example.

The management apparatus 10 and the terminal apparatus 30 according to the present embodiment may use one or more of the hardware elements of the computer 100 as illustrated in FIG. 2 to implement various processes as described below.

Figure 3:
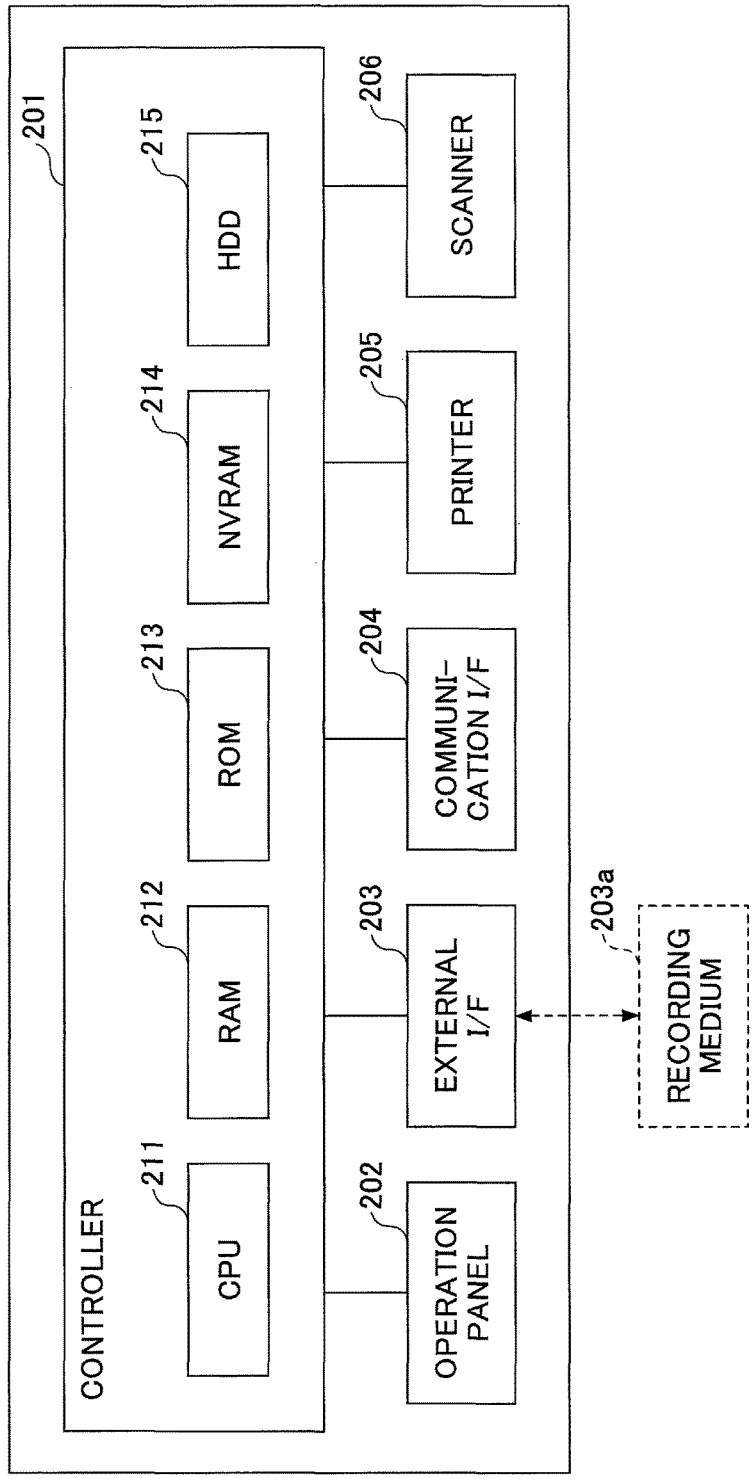
FIG. 3 is a block diagram illustrating an example hardware configuration of a device according to the first embodiment.

Next, the hardware configuration of the device 20 according to the first embodiment will be described with reference to FIG. 3. FIG. 3 is a block diagram illustrating an example hardware configuration of the device 20 according to the present embodiment.

In FIG. 3, the device 20 includes a controller 201, an operation panel 202, an external I/F 203, a communication I/F 204, a printer 205, and a scanner 206.

The controller 201 includes a CPU 211, a RAM 212, a ROM 213, a NVRAM 214, and an HDD 215.

The ROM 213 stores various programs and data. The RAM 212 temporarily stores programs and data. The NVRAM 214 stores setting information, for example. The HDD 215 also stores various programs and data.

The CPU 211 controls and implements functions of the device 20 by loading programs, data, and/or setting information from the ROM 213, the NVRAM 214, and/or the HDD 215 into the RAM 212, for example, to execute various processes, for example.

The operation panel 202 includes an input device for receiving an input from a user, and a display device for displaying information. The external I/F 203 is an interface with an external device. The external device may be a recording medium 203a, for example. The device 20 can read/write data from/on the recording medium 203a via the external I/F 203. The recording medium 203a may be an IC card, a flexible disk, a CD, a DVD, an SD memory card, or a USB memory, for example.

The communication I/F 204 is an interface connecting the device 20 to the network N. In this way, the device 20 can perform data communication via the communication I/F 204. The printer 205 is a printing device for printing print data on paper, for example. The scanner 206 is a scanning device for generating image data (electronic data) by scanning a document, for example.

The device 20 according to the present embodiment may use one or more of the above hardware elements to implement various processes as described below.

<Functional Configuration>

<<Device Management Apparatus>>

Figure 4:
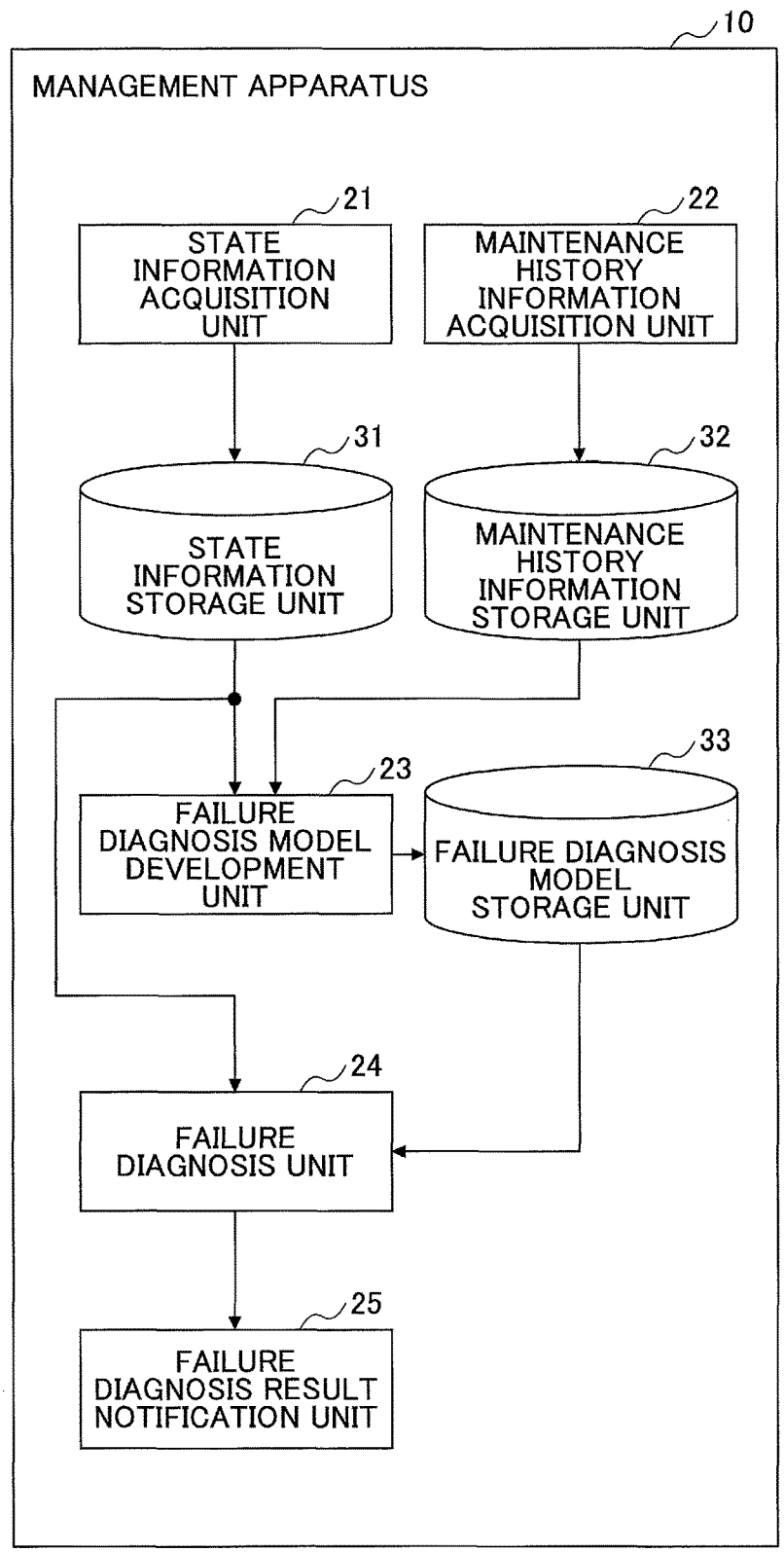
FIG. 4 is a block diagram illustrating an example functional configuration of a management apparatus according to the first embodiment.

The management apparatus 10 according to the first embodiment may have a functional configuration as illustrated in FIG. 4, for example. FIG. 4 is a block diagram illustrating an example functional configuration of the management apparatus 10 according to the first embodiment.

The management apparatus 10 may have the CPU 106 execute a relevant program installed in the management apparatus 10 to implement a state information acquisition unit 21, a maintenance history information acquisition unit 22, a failure diagnosis model development unit 23, a failure diagnosis unit 24, and a failure diagnosis result notification unit 25, for example. The management apparatus 10 also includes a state information storage unit 31, a maintenance history information storage unit 32, and a failure diagnosis model storage unit 33. The above storage units may be implemented by the HDD 108 of the management apparatus 10 or a storage device connected to the management apparatus 10 via the network N, for example.

The state information acquisition unit 21 acquires state information corresponding to a plurality of variables related to the device 20, and stores the state information in the state information storage unit 31. The state information may include a current output value of a sensor arranged in the device 20, information relating to the consumption degree of consumable parts (e.g., counter value or number of times used), and failure history information, for example. The maintenance history information acquisition unit 22 acquires information such as daily maintenance records input to the management apparatus 10, the device 20, or the terminal apparatus 30 by a CE, for example, and stores the acquired information as maintenance history information in the maintenance history information storage unit 32. The maintenance history information may include information items, such as the device number of the device 20, the maintenance date, the failure phenomenon, the cause of failure, the measures implemented, the parts replaced, and the response time, for example.

The failure diagnosis model development unit 23 uses the state information stored in the state information storage unit 31 and the maintenance history information stored in the maintenance history information storage unit 32 to develop a failure diagnosis model as described below. Note that the failure diagnosis model development unit 23 may automatically develop the failure diagnosis model, or the failure diagnosis model development unit 23 may assist a data analyst in developing the failure diagnosis model, for example. The failure diagnosis model development unit 23 stores the failure diagnosis model that has been developed in the failure diagnosis model storage unit 33.

The failure diagnosis unit 24 performs failure diagnosis as described below using the state information stored in the state information storage unit 31 and the failure diagnosis model stored in the failure diagnosis model storage unit 33. The failure diagnosis result notification unit 25 notifies a CE of a failure diagnosis result by displaying the failure diagnosis result on the management apparatus 10 or the terminal apparatus 30, for example.

Figure 5:
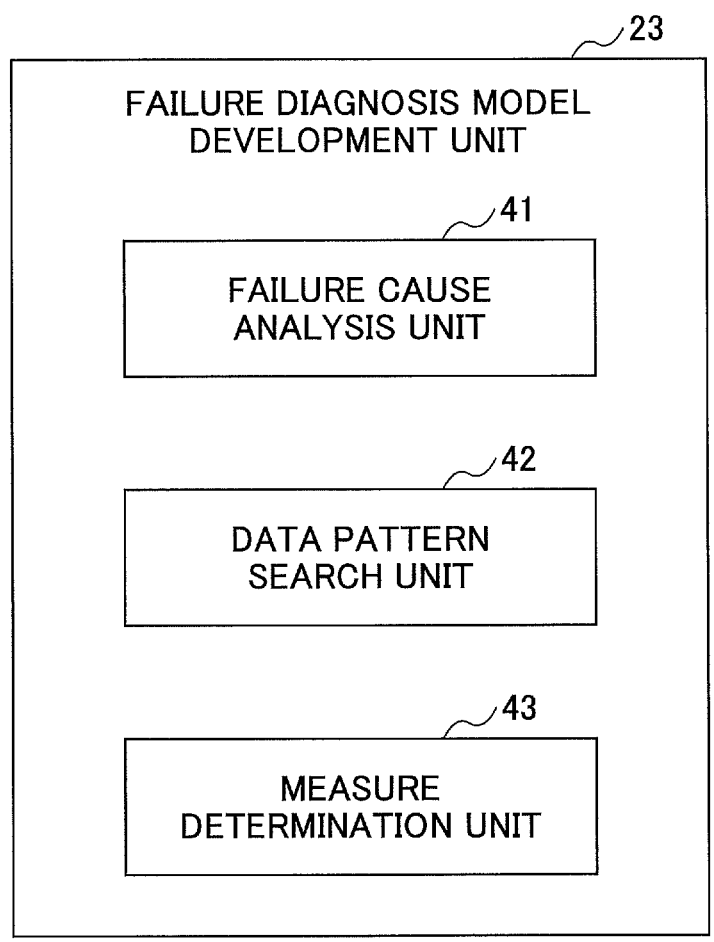
FIG. 5 is a block diagram illustrating an example functional configuration of a failure diagnosis model development unit according to the first embodiment.

The failure diagnosis model development unit 23 of FIG. 4 may have a functional configuration as illustrated in FIG. 5, for example. FIG. 5 is a block diagram illustrating an example functional configuration of the failure diagnosis model development unit 23. The failure diagnosis model development unit 23 includes a failure cause analysis unit 41, a data pattern search unit 42, and a measure determination unit 43.

The failure cause analysis unit 41 analyzes one or more causes of a failure phenomenon based on the maintenance history information. The data pattern search unit 42 searches for a data pattern of state information that commonly occurs before the occurrence of a failure with respect to each of the causes of failure analyzed. The data pattern of state information identified by the search is used by the failure diagnosis unit 24 to determine the cause of a failure that has occurred in the device 20.

The measure determination unit 43 determines the necessary measure and the necessary part for responding to each of the causes of failure analyzed based on the maintenance history information. The failure diagnosis model development unit 23 develops a failure diagnosis model that associates the data pattern of state information to be used to identify the cause of failure, the necessary measure, and the necessary part with each of the causes of failure analyzed, and stores the failure diagnosis model that has been developed in the failure diagnosis model storage unit 33. Note that in some embodiments, the failure diagnosis model development unit 23 may simply store each of the causes of failure analyzed in association with the data pattern of state information to be used to identify the cause of failure, the necessary measures, and the necessary parts in the failure diagnosis model storage unit 33.

<Process>

In the following, process operations of the device management system according to the first embodiment are described.

<<Failure Diagnosis Model Development>>

The failure diagnosis model development unit 23 uses the state information stored in the state information storage unit 31 and the maintenance history information stored in the maintenance history information storage unit 32 to create a failure diagnosis model.

Figure 6:
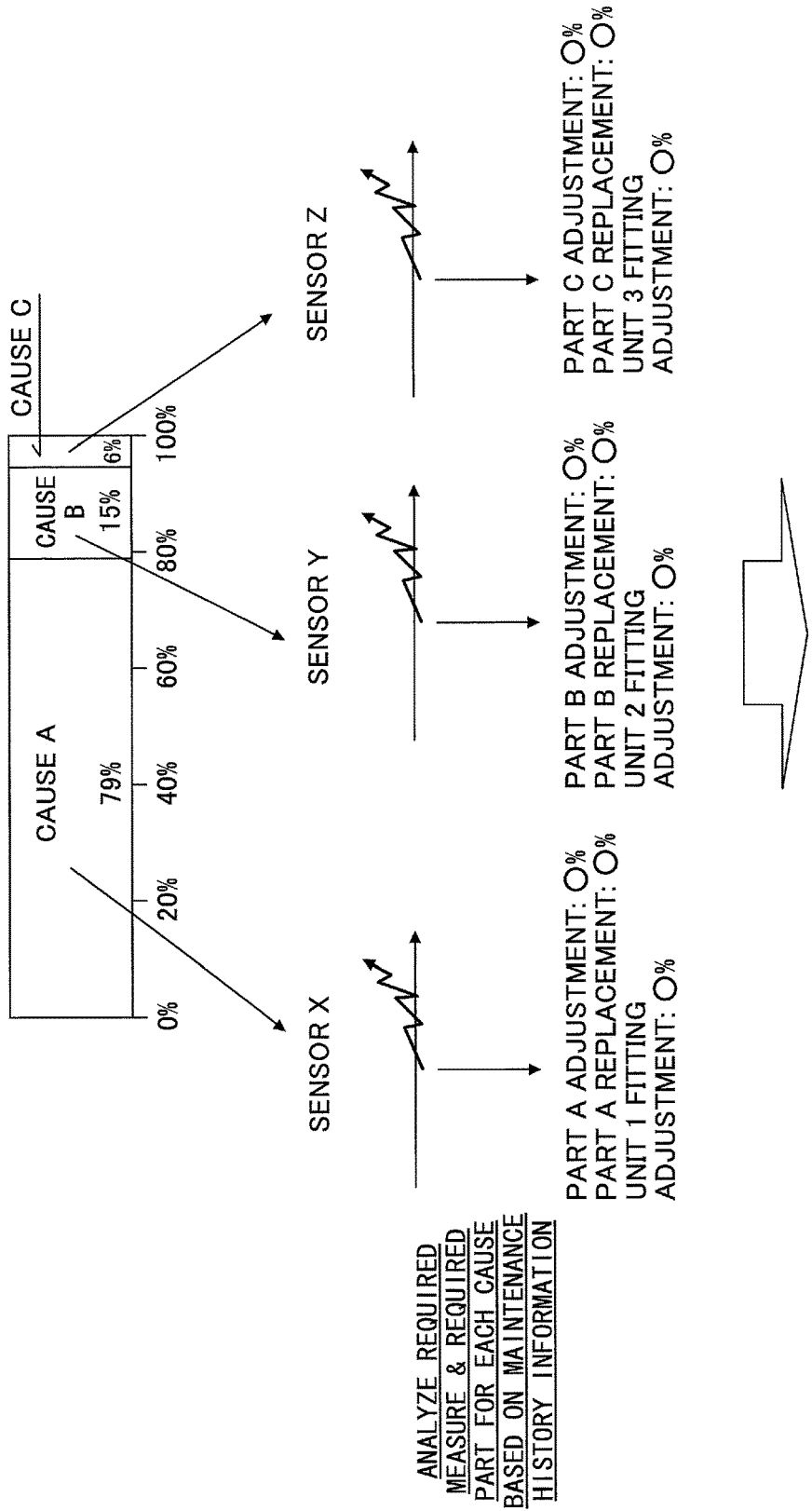
FIG. 6 is a diagram illustrating an example process for creating a failure diagnosis model.

FIG. 6 is a diagram illustrating an example process of creating a failure diagnosis model. The failure cause analysis unit 41 of the failure diagnosis model development unit 23 analyzes the causes of a given failure P based on the maintenance history information. Note that FIG. 6 illustrates an example case where the analysis reveals that cause A is the cause of failure P 79% of the time, cause B is the cause of failure P 15% of the time, and cause C is the cause of failure P 6% of the time.

Then, the data pattern search unit 42 searches for a data pattern of state information that commonly occurs before the occurrence of failure P with respect to each of the causes A to C analyzed. Specifically, the failure data pattern search unit 42 searches for a data pattern that commonly occurs before the occurrence of failure P, with respect to a case where failure P occurs due to cause A, a case where failure P occurs due to cause B, and a case where failure P occurs due to cause C.

For example, in FIG. 6, the search reveals that a characteristic data pattern commonly occurs in sensor X before the occurrence of failure P due to cause A. Also, a characteristic data pattern commonly occurs in sensor Y before the occurrence of failure P due to cause B. Further, a characteristic data pattern commonly occurs in sensor Z before the occurrence of failure P due to cause C.

Note that the data patterns that commonly occur in the sensors X to Z before the occurrence of failure P due to causes A to C correspond to failure diagnosis logic for identifying the causes A to C as the cause of failure P in failure diagnosis.

Then, the measure determination unit 43 refers to the maintenance history information to analyze the measures implemented by the CE and the parts replaced by the CE, with respect to each of the causes A to C analyzed for failure P, and determines the necessary measure and the necessary part for each of the causes A to C of failure P.

For example, in FIG. 6, with respect to the occurrence of failure P due to cause A, adjustment of part A, replacement of part A, and fitting adjustment of unit 1 are determined as the measures implemented by the CE and the parts replaced by the CE. Also, note that in FIG. 6, an implementation percentage of each of the measures and part replacement is determined.

Further, in FIG. 6, with respect to the occurrence of failure P due to cause B, adjustment of part B, replacement of part B, and fitting adjustment of unit 2 are determined as the measures implemented by the CE and the parts replaced by the CE, and the corresponding implementation percentage for each of the measures and part replacement is determined.

Further, in FIG. 6, with respect to the occurrence of failure P due to cause C, adjustment of part C, replacement of part C, and fitting adjustment of unit 3 are determined as the measures implemented by the CE and the parts replaced by the CE, and the corresponding implementation percentage for each of the measures and part replacement is determined.

As illustrated in FIG. 6, the failure diagnosis model development unit 23 can develop a failure diagnosis model associating the data patterns of sensors X to Z used for identifying the causes A to C of failure P with the necessary parts and the necessary measures for responding to the failure P caused by the causes A to C. In this way, the failure diagnosis model development unit 23 can create a failure diagnosis model for identifying the specific cause of failure P that has occurred in the device 20 and determining the necessary parts and necessary measures for responding to the specific cause of failure.

<<Failure Diagnosis>>

The failure diagnosis unit 24 uses the state information stored in the state information storage unit 31 and the failure diagnosis model stored in the failure diagnosis model storage unit 33 to perform failure diagnosis.

Figure 7:
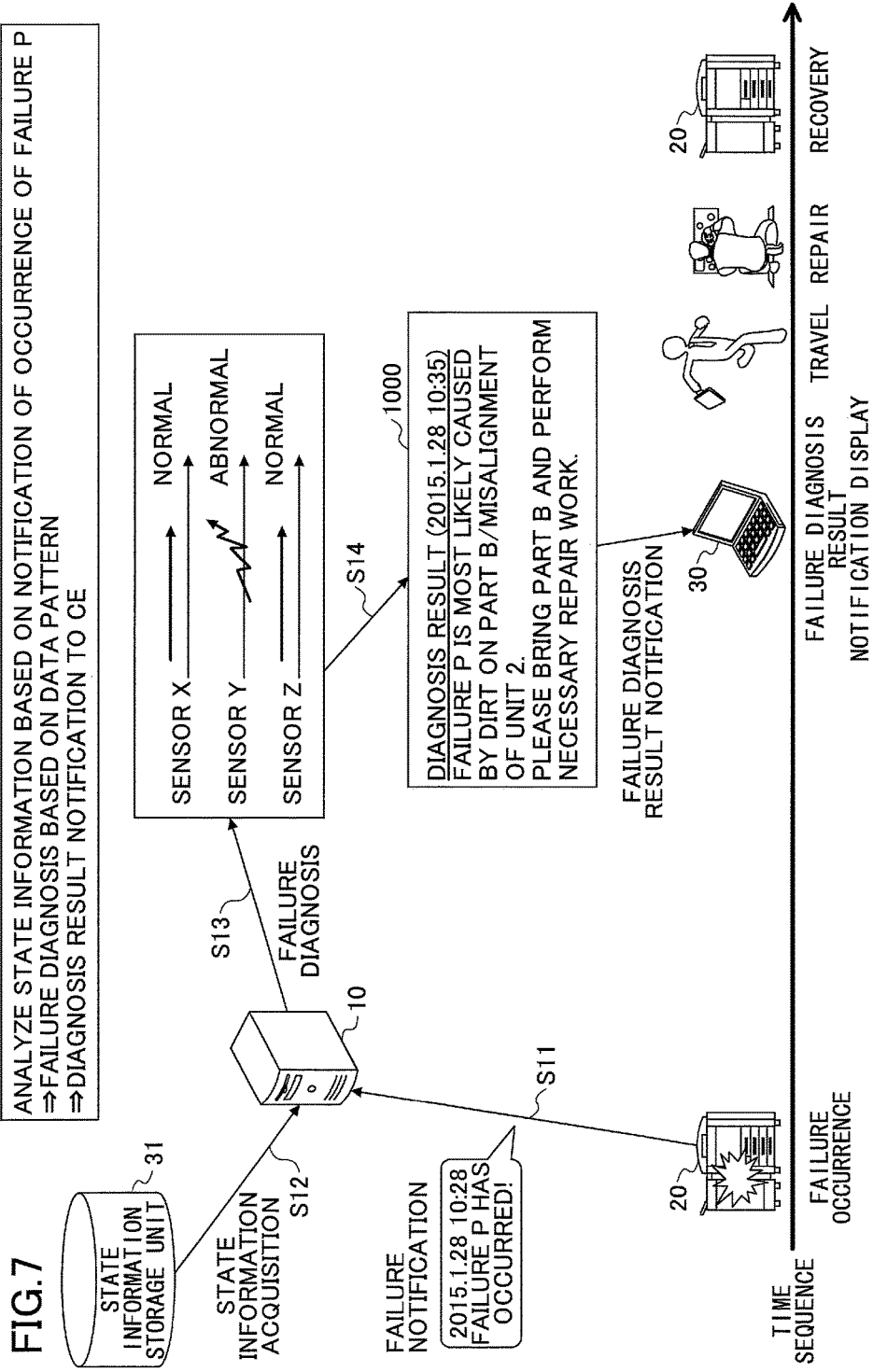
FIG. 7 is a diagram illustrating an example failure diagnosis process.

FIG. 7 is a diagram illustrating an example failure diagnosis process according to the present embodiment.

In step S11, the management apparatus 10 receives notification of the occurrence of failure P (failure notification) from the device 20. In step S12, the management apparatus 10 acquires from the state information storage unit 31 state information of the device 20 that has sent the notification of the occurrence of failure P to the management apparatus 10.

In step S13, the management apparatus 10 analyzes data patterns of the sensors X to Z from the state information of the device 20 acquired in step S12. Then, the management apparatus 10 uses the data patterns for identifying the causes A to C of failure P included in the failure diagnosis model to identify the cause of the failure P that has occurred in the device 20.

Note that FIG. 7 illustrates an example where the data pattern for identifying cause B of failure P is occurring in the sensor Y. Thus, in this case, the management apparatus 10 may identify cause B as the cause of failure P that has occurred in the device 20, and determine that adjustment of part B, replacement of part B, and fitting adjustment of unit 2 are the necessary measures and parts for restoring the device 20 from the failure P brought about by cause B.

In step S14, the failure diagnosis result notification unit 25 may notify a CE of the failure diagnosis result by displaying a diagnosis result notification screen 1000 generated based on the failure diagnosis result on the terminal apparatus 30, for example. The CE may thus be informed of the occurrence of the failure P due to cause B, and the necessary parts and measures for responding to the failure P brought about by cause B, based on the diagnosis result notification screen 1000 displayed on the terminal apparatus 30, for example.

Figure 8:
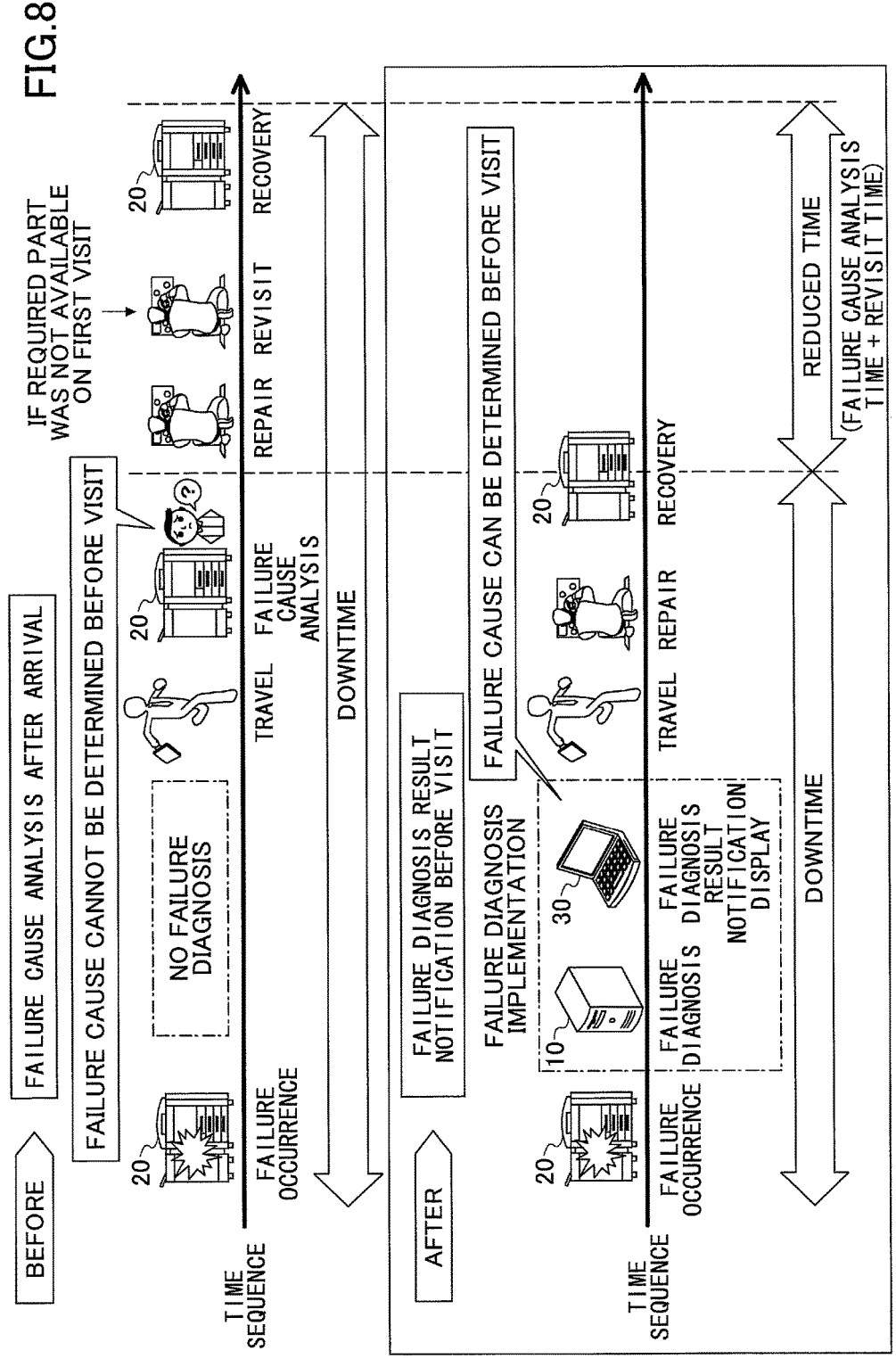
FIG. 8 is a diagram describing a difference in downtime depending on whether failure diagnosis according to the first embodiment is implemented.

FIG. 8 is a diagram describing a difference in downtime depending on whether failure diagnosis according to the present embodiment is implemented. Note that the upper portion of FIG. 8 illustrates the downtime of the device 20 (i.e., time during which the device 20 cannot be used) in a case where failure diagnosis of the present embodiment is not implemented, and the lower portion of FIG. 8 illustrates a case where failure diagnosis according to the present embodiment is implemented.

In the case where failure diagnosis of the present embodiment is not implemented, oftentimes, the cause of a failure that has occurred in the device 20 cannot be identified until a CE reaches the site of the device 20 and examines the device 20. Also, the time involved in determining the specific cause of failure may vary depending on the ability of the CE, for example. Further, if the CE does not have the parts necessary for fixing the failure brought about by the specific cause, the CE may have to revisit the site of the device 20, for example.

On the other hand, in the case where failure diagnosis of the present embodiment is implemented, the CE can check the failure diagnosis result before arriving at the site of the device 20, and as such, the CE does not need the time to examine the device 20 to determine the specific cause of the failure after arriving at the site of the device 20. Also, the CE can procure the parts necessary for responding to the specific failure before visiting the site of the device 20 so that the CE would not have to revisit the site of the device 20, and in this way, time may be further saved.

As can be appreciated, in the case where failure diagnosis of the present embodiment is implemented, the time for examining the device 20 after arriving at the site of the device 20 to identify the cause of failure and the time for revisiting the site may become unnecessary, and in this way, the downtime during which the device 20 cannot be used may be reduced as compared with the case where the failure diagnosis of the present embodiment is not implemented.

FIG. 9 illustrates an example diagnosis result notification screen 1010. The diagnosis result notification screen 1010 of FIG. 9 includes operation instructions (measures) and details of the failure diagnosis as the failure diagnosis result. By checking the diagnosis result notification screen 1010 of FIG. 9, the CE may determine, based on the failure diagnosis result, the cause of failure that has occurred in the device 20 before arriving at the site of the device 20, and also determine the operations (measures) to be implemented on the device 20 upon arriving at the site of the device 20.

According to an aspect of the first embodiment as described above, a CE may be able to determine, based on a failure diagnosis result obtained using a failure diagnosis model, the cause of failure that has occurred in an electronic device and the necessary measures to be implemented in response to the cause of failure before going to the site of the electronic device. In this way, the CE may be able to perform maintenance work in a more efficient manner, for example.

Second Embodiment

In the following, the device management system according a second embodiment of the present invention is described.

In the device management system according to the second embodiment a mechanism for ordering parts, a mechanism for determining a CE to be dispatched, and a mechanism for improving the accuracy of failure diagnosis are added to the device management system according to the first embodiment. Note that in the following, descriptions of features of the device management system according to the second embodiment that are substantially identical to those of the device management system according to the first embodiment will be omitted as appropriate.

Figure 10:
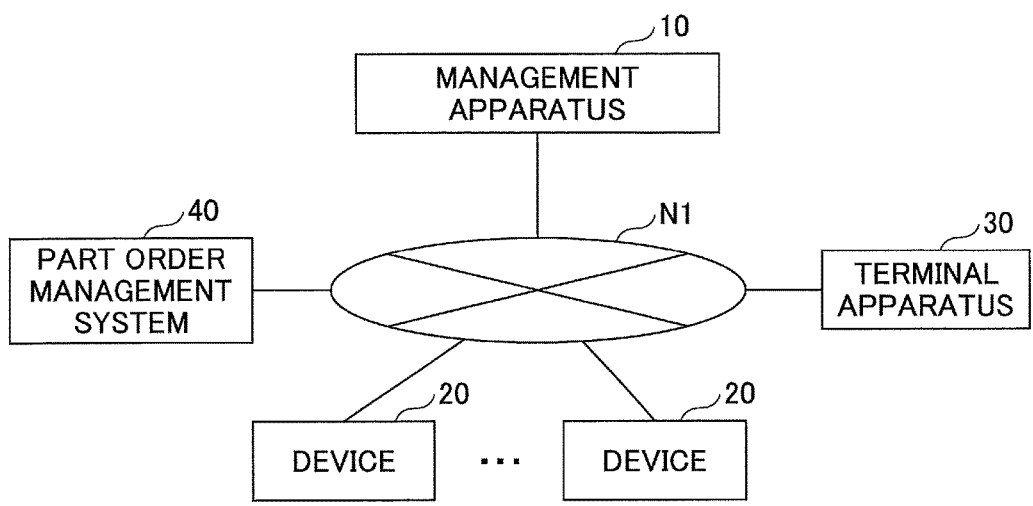
FIG. 10 is a diagram illustrating a system configuration of the device management system according to a second embodiment of the present invention.

FIG. 10 is a diagram illustrating an example system configuration of the device management system according to the second embodiment. The device management system according to the second embodiment includes a part order management system 40 in addition to the components of the device management system according to the first embodiment. The part order management system 40 accepts an order for one or more parts from the management apparatus 10 and manages the accepted part order.

Figure 11:
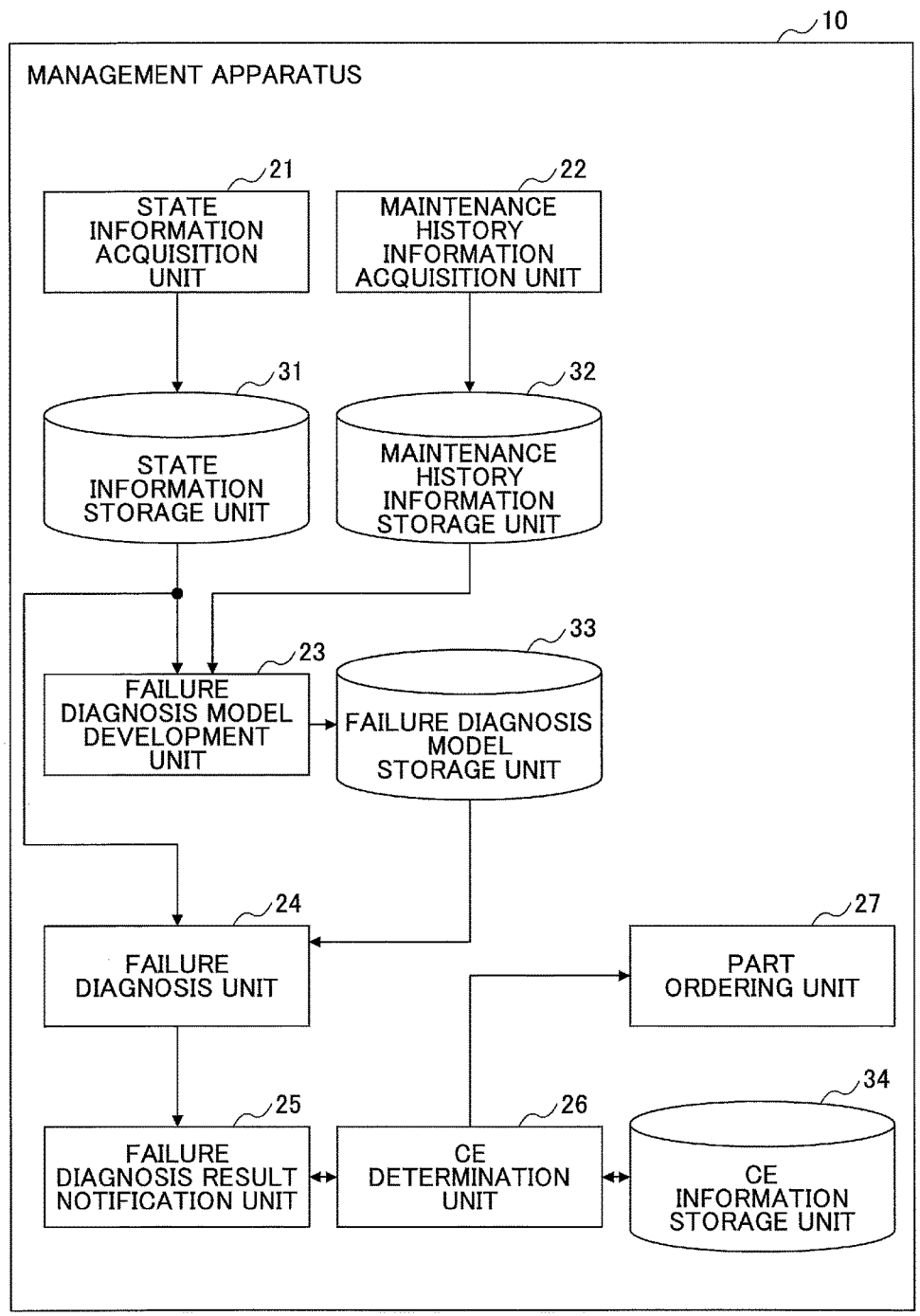
FIG. 11 is a block diagram illustrating an example functional configuration of the device management apparatus according to the second embodiment.

FIG. 11 is a block diagram illustrating an example functional configuration of the management apparatus 10 according to the second embodiment. The management apparatus 10 according to the second embodiment includes a CE determination unit 26, a part ordering unit 27, and a CE information storage unit 34 in addition to the functional elements of the management apparatus 10 according to the first embodiment.

When a failure occurs in the device 20, the CE determination unit 26 determines a CE that is to respond to the failure based on CE information, such as the current position of the CE, the parts carried by the CE, and maintenance records of the CE, as described in detail below. If necessary, the part ordering unit 27 sends a part order to the part order management system 40 to order the parts determined to be necessary by the failure diagnosis unit 24 for responding to the failure that has occurred in the device 20.

The CE information storage unit 34 stores CE information such as that illustrated in FIG. 12, for example. FIG. 12 is a table illustrating an example of the CE information. In FIG. 12, the CE information stores, for each CE, the current position of the CE, parts carried by the CE, and the experience of the CE in performing repair work for specific failures and performing specific maintenance work, for example. Note that in FIG. 12, the information indicating the experience of the CE is represented by the number of times the CE has performed the specific type of work. Also, note that the numbers in parentheses indicated in the columns under "Experience with Failure P" in FIG. 12 represent the number of times the CE has successfully completed the repair work for failure P without having to revisit the site.

Figure 13:
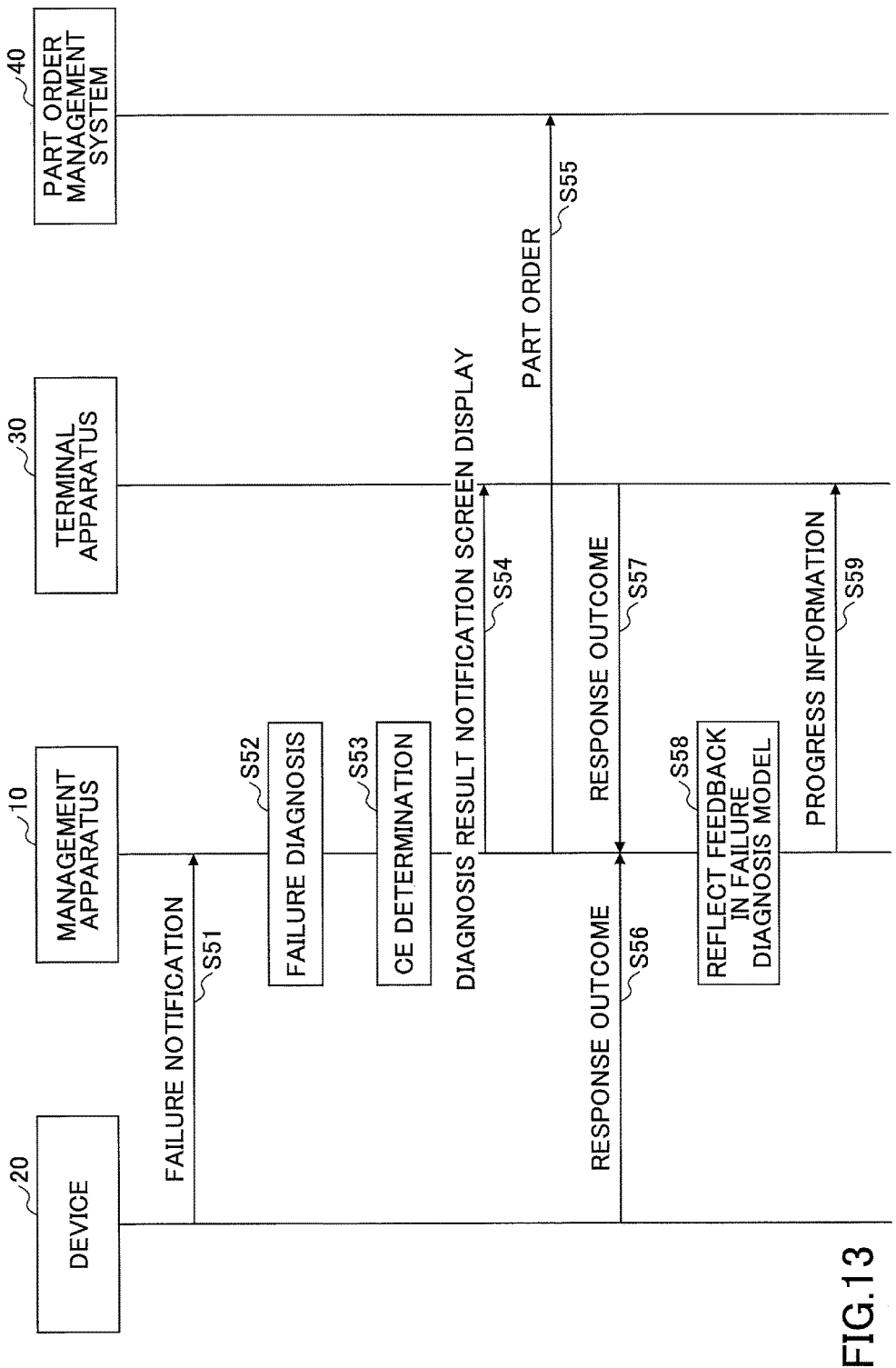
FIG. 13 is a sequence chart illustrating an example failure diagnosis result notification process.

FIG. 13 is a sequence chart illustrating an example failure diagnosis result notification process according to the present embodiment.

In step S51, the management apparatus 10 receives a failure notification from the device 20. In step S52, the failure diagnosis unit 24 of the management apparatus 10 performs failure diagnosis on the failure that has occurred in the device 20.

In step S53, the CE determination unit 26 of the management apparatus 10 determines a CE that is to respond to the failure that has occurred in the device 20. For example, the CE determination unit 26 may determine the CE that is in possession of the parts required for responding to the failure that has occurred in the device 20 or the CE that is currently located close to the site of the device 20, or the CE determination unit 26 may determine the CE by a CE determination process as described below with reference to FIG. 14.

In step S54, the failure diagnosis result notification unit 25 may notify the CE of the failure diagnosis result, for example, by displaying the diagnosis result notification screen 1010 generated based on the failure diagnosis result on the terminal apparatus 30 of the CE. Also, in step S55, if the CE determination unit 26 determines that the CE does not have the parts necessary for responding to the failure, the CE determination unit 26 requests the part ordering unit 27 to order the necessary parts. In turn, the part ordering unit 27 sends an order for the parts necessary for responding to the failure to the part order management system 40.

After the CE checks the diagnosis result notification screen 1010 displayed on the terminal apparatus 30 to determine the cause of failure and the measures and parts required for restoring the device 20, the CE goes to the site of the device 20 and performs necessary repair work on the device 20. After appropriately responding to the failure and restoring the device 20, in step S56 or step S57, the CE inputs, via the device 20 or the terminal apparatus 30, a response outcome including information on the accuracy of the failure diagnosis result as a maintenance record.

The information on the accuracy of the failure diagnosis result is information indicating whether the cause of failure, the necessary measures, and the necessary parts for responding to the failure indicated by the failure diagnosis result was accurate. In step S58, for example, the failure diagnosis model development unit 23 may reflect such feedback from the CE in the failure diagnosis model to improve the accuracy of failure diagnosis by the failure diagnosis model.

Also, in step S59, the management apparatus 10 may monitor the operation of the device 20 that has recovered from the failure, and provide progress information as feedback to the CE that was in charge of responding to the failure and restoring the device 20, for example.

Figure 14:
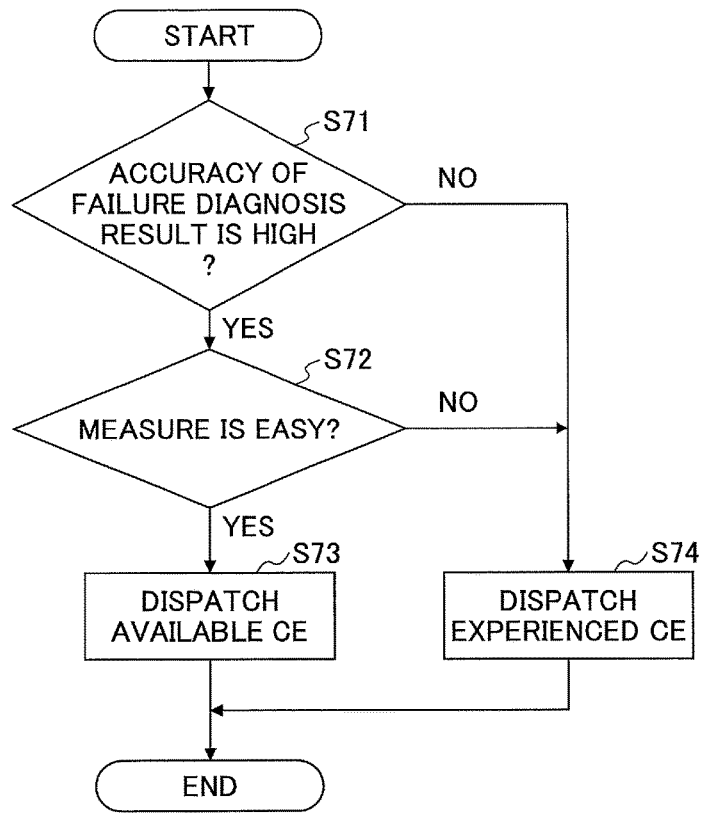
FIG. 14 is a flowchart illustrating an example CE determination process.

Note that the CE determination process of step S53 may be implemented by the process steps as illustrated in FIG. 14, for example. FIG. 14 is a flowchart illustrating example process steps of the CE determination process.

In step S71, the CE determination unit 26 determines whether the accuracy of the failure diagnosis result is high. If the accuracy of the failure diagnosis result is determined to be high, the CE determination unit 26 proceeds to step S72 where it determines whether the measure to be implemented in response to the failure is easy. If the measure to be implemented in response to the failure is determined to be easy, the CE determination unit 26 proceeds to step S73 where it determines a CE that is available. Note that in step S73, because the failure diagnosis result is determined to have a high accuracy rate and the measure to be implemented in response to the failure is determined to be easy, a CE that is not necessarily experienced but is currently available is preferably arranged to respond to the failure.

On the other hand, if the accuracy of the failure diagnosis result is determined to be low (NO in step S71), there is a high chance that the failure diagnosis result is not accurate. Accordingly, in step S74, the CE determination unit 26 arranges an experienced (skilled) CE that is capable of flexibly responding to various circumstances to be in charge of responding to the failure. Similarly, if it is determined that the measure to be implemented in response to the failure is not easy (NO in step S72), the CE determination unit 26 arranges an experienced (skilled) CE to be in charge of responding to the failure in step S74. Note that an experienced CE may be identified based on the experience of the CE with regard to specific repair work and maintenance work included in the CE information of FIG. 12, for example.

Figure 15:
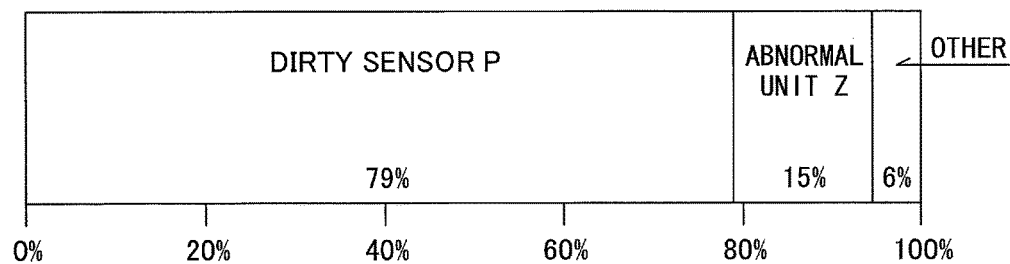
FIG. 15 is a diagram illustrating example causes of a failure.

Note that the accuracy of the failure diagnosis result may be determined in the following manner, for example. FIG. 15 is a diagram indicating example causes of a failure. In the following, the accuracy of a diagnosis result attributing "dirty sensor P" as the cause of failure is described.

For example, signs of a dirty sensor P may include a case where a predetermined sensor light intensity is at least a predetermined value. Thus, "predetermined sensor light intensity is at least predetermined value" may be defined as a determination condition for determining a dirty sensor P. In view of the above, failures may be classified based on whether the failure was due to a dirty sensor P, and whether the determination condition applied, for example.

Figure 16:
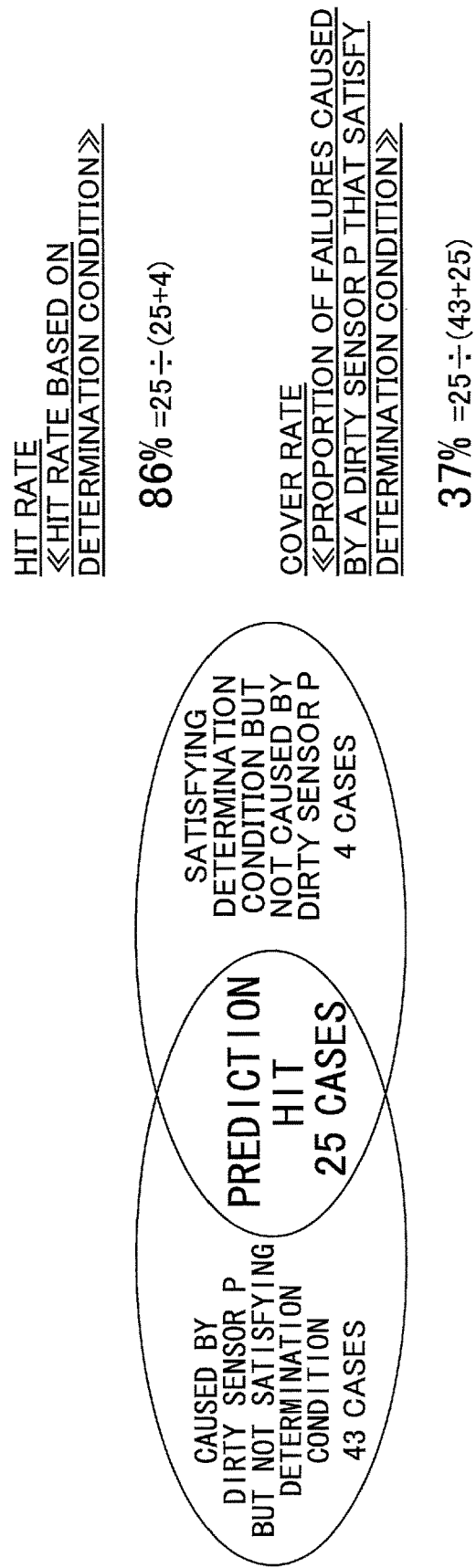
FIG. 16 is a diagram classifying failures based on diagnosis accuracy.

FIG. 16 is a diagram illustrating an example classification of failures. In FIG. 16, 25 cases are classified as "prediction hit", 43 cases are classified as failures "caused by dirty sensor P but not satisfying determination condition", and 4 cases are classified as failures "satisfying determination condition but not caused by dirty sensor P". Thus, in FIG. 16, the hit rate based on the determination condition is 86%, and the cover rate representing the proportion of failures caused by a dirty sensor P that satisfy the determination condition is 37%. For example, the determination of whether the accuracy of a failure diagnosis result is high may be made based on whether the hit rate and the cover rate of the cause of failure identified by the failure diagnosis result are above predetermined rates.

According to an aspect of the second embodiment, a mechanism for ordering parts, a mechanism for determining a CE, and a mechanism for improving the accuracy of failure diagnosis may be implemented in addition to the features of the device management system according to the first embodiment.

Third Embodiment

In the following, the device management system according to a third embodiment of the present invention is described. The device management system according to the third embodiment includes a mechanism for predicting a failure of the device 20 in advance and determining a CE to be dispatched to the device 20 to perform necessary maintenance work, for example.

Figure 17:
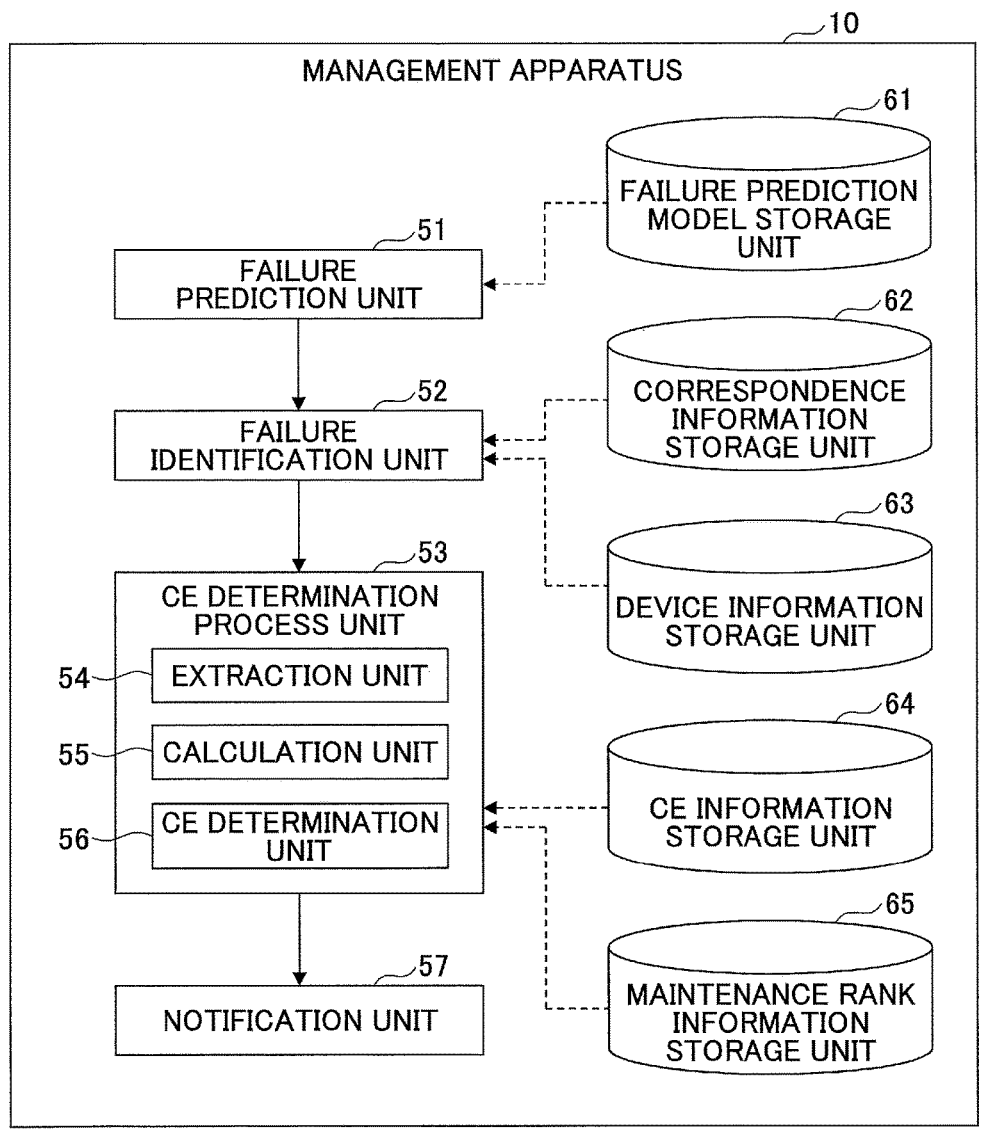
FIG. 17 is a block diagram illustrating an example functional configuration of a management apparatus according to a third embodiment of the present invention.

FIG. 17 is a block diagram illustrating an example functional configuration of the management apparatus 10 according to the third embodiment.

The management apparatus 10 according to the third embodiment includes a failure prediction unit 51, a failure identification unit 52, a CE determination process unit 53, and a notification unit 57. These functional elements may be implemented by relevant processes executed by the CPU 106 of the management apparatus 10 based on one or more programs installed in the management apparatus 10, for example.

Further, the management apparatus 10 of the present embodiment includes a failure prediction model storage unit 61, a correspondence information storage unit 62, a device information storage unit 63, a CE information storage unit 64, and a maintenance rank information storage unit 65. The above storage units may be implemented by the HDD 108 of the management apparatus 10 or a storage device connected to the management apparatus 10 via the network N, for example.

The failure prediction unit 51 predicts a failure that is likely to occur in the device 20 based on device state information including various sensor values and counter values obtained from the device 20 at predetermined time intervals, for example, and a failure prediction model stored in the failure prediction model storage unit 61.

Note that the various sensor values of the device state information may include, for example, measurements of the current, the voltage, and/or the temperature of various components included in the device 20 that are obtained by various sensors. Also, the counter values of the device state information may include, for example, the number of times the printer 205 has printed print data on the paper.

The failure identification unit 52 determines specific information relating to the failure predicted by the failure prediction unit 51, such as the cause of the predicted failure and position information of the device 20, by referring to correspondence information stored in the correspondence information storage unit 62 and device information stored in the device information storage unit 63. Then, the failure identification unit 52 generates failure information including the identified cause of failure and the position information of the device, for example.

As described below, the failure information includes information items, such as a device ID uniquely identifying the device 20 for which a failure is predicted, the failure name of the predicted failure, the cause of the failure, the parts required for maintenance or repair work, and the estimated work time, for example. The failure information may also store information on a measure to be implemented in response to the cause of the failure and required parts, for example.

The CE determination process unit 53 refers to CE information stored in the CE information storage unit 64 and the maintenance rank information stored in the maintenance rank information storage unit 65, and determines a CE to be dispatched to the device 20 for which a failure is predicted based on the failure information generated by the failure identification unit 52.

The CE determination process unit 53 includes an extraction unit 54, a calculation unit 55 and a CE determination unit 56. The extraction unit 54 extracts one or more candidate CEs to be dispatched to the device 20 based on the position information of the device 20 and position information indicating the current position of the CEs, for example. The calculation unit 55 calculates, for each of the candidate CEs extracted, the time required for the CE to arrive at the site of the device 20 (arrival time), and the cost required for dispatching the CE. The CE determination unit 56 determines the CE to be dispatched from among the candidate CEs based on the arrival time and cost calculated by the calculation unit 55 for each of the candidate CEs.

The notification unit 57 sends a notification (dispatch request) to the terminal apparatus 30 at the call center for dispatching the CE determined by the CE determination process unit 53 to the device 20. Thus, in the present embodiment, an operator may be able to dispatch an appropriate CE to the device 20, for example.

The failure prediction model storage unit 61 stores a failure prediction model for predicting the occurrence of a failure in the device 20 based on the device state information acquired from the device 20. Note that a failure prediction model refers to a set of data modeling patterns of measurement values and counter values at the time a failure occurs. The failure prediction model storage unit 61 stores a failure prediction model for each type of failure. For example, the failure prediction model storage unit 61 may store a failure prediction model A for predicting the occurrence of failure A, a failure prediction model B for predicting the occurrence of failure B, and a failure prediction model C for predicting the occurrence of failure C.

The correspondence information storage unit 62 stores correspondence information associating each type of failure with corresponding information, such as the cause of failure, the required parts, and the estimated work time for responding to the failure. Note that the correspondence information is described in detail below.

The device information storage unit 63 stores device information associating each device 20 with the client using the device 20 and the location of the device 20, for example. Note that the device information is described in detail below.

The CE information storage unit 64 stores CE information associating each CE with position information indicating the current position of the CE, the working state of the CE (i.e., whether the CE is currently working), and capability information indicating the competence (rank) of the CE with respect to maintenance work, for example. Note that the CE information is described in detail below.

The maintenance rank information storage unit 65 stores maintenance rank information including information on competence with respect to maintenance work. Note that the maintenance rank information is described in detail below.

In the following, the correspondence information stored in the correspondence information storage unit 62 is described with reference to FIG. 18. FIG. 18 is a table illustrating an example of the correspondence information.

As illustrated in FIG. 18, the correspondence information includes information items, such as "failure name", "failure cause", "required part", and "estimated work time". The "failure name" indicates the name of a failure that has occurred or is expected to occur in the device 20. Note that the failure name may be any information for identifying a failure (failure identification information) and is not limited to the name of the failure. For example, the failure name may alternatively be an identification number, a control number, or an error code of the failure.

The "failure cause" is information on the cause of the failure that has occurred or is expected to occur in the device 20. The "required part" includes the names of one or more parts that need to be replaced in order to repair the device 20 or to prevent the occurrence of the failure in the device 20. The "estimated work time" indicates the time required for maintenance or repair work such as parts replacement in response to the failure that has occurred or is expected to occur in the device 20.

In the following, the device information stored in the device information storage unit 63 is described with reference to FIG. 19. FIG. 19 is a table illustrating an example of the device information.

As illustrated in FIG. 19, the device information includes information items, such as "device ID", "client name", "location", and "device type", for example. The "device ID" is information uniquely identifying the device 20 (device identification information). For example, the device ID may be a production serial number or identification information assigned to the device 20 by an administrator of the device management system. The "client name" indicates the name of the client operating the client environments in which the device 20 is installed. The "location" is information indicating the location where the device 20 is installed (e.g., latitude and longitude information). The "device type" is information indicating the type of the device 20.

Note that the information on the location of the device 20 included in the device information is not limited to latitude and longitude information. For example, the address of the client's office where the device 20 is installed may be used instead.

In the following, the CE information stored in the CE information storage unit 64 is described with reference to FIG. 20. FIG. 20 is a table illustrating an example of the CE information.

As illustrated in FIG. 20, the CE information includes information items, such as "CE ID", "affiliated service station", "current position", "working state", "rank", "CE name", and "phone number", for example. The "CE ID" is information uniquely identifying the CE. The "affiliated service station" indicates the name of the service station with which the CE is affiliated. Note that the CE may be affiliated with more than one service station.

The "current position" indicates latitude and longitude information acquired from the terminal apparatus 30 of a CE. Note that the current position may be obtained from the terminal apparatus 30 of the CE at predetermined time intervals and updated at the predetermined time intervals, for example. The "working state" is information indicating whether the CE is currently engaged in maintenance work for a given device 20. Note that in the case where the CE is currently engaged in maintenance work for a given device 20, the working state information may also include information indicating the estimated remaining work time for completing the maintenance work, for example.

The "rank" is information indicating the competence of the CE with respect to maintenance work. Note that the rank included in the CE information is associated with the maintenance rank information described below. The "CE name" indicates the name of the CE. The "phone number" indicates the phone number for contacting the CE.

Note that in some embodiments, the CE information may include further information relating to the capability of the CE, such as the years of experience with maintenance work, license and qualifications, and/or training for maintenance work, for example.

Figures 21, 22:
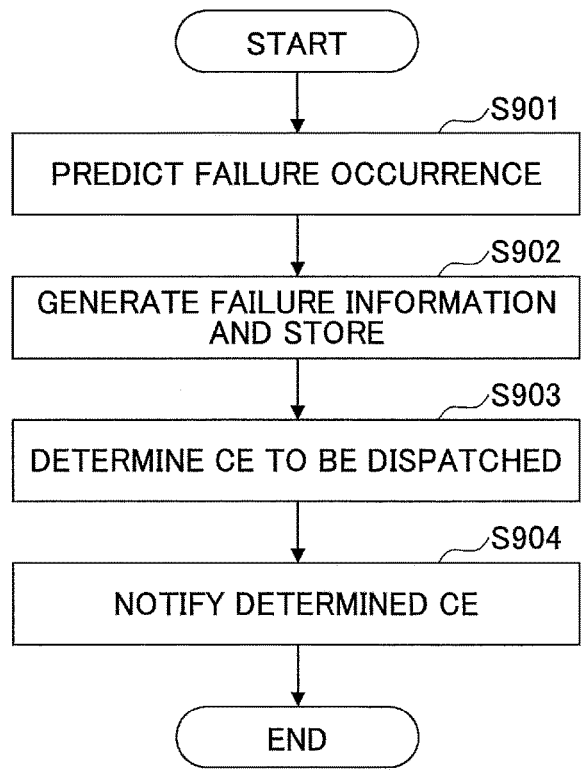
FIG. 21 is a table illustrating an example of maintenance rank information.
FIG. 22 is a flowchart illustrating an example dispatch notification process according to the third embodiment.

In the following, the maintenance rank information stored in the maintenance rank information storage unit 65 is described with reference to FIG. 21. FIG. 21 is a table illustrating an example of the maintenance rank information.

As illustrated in FIG. 21, the maintenance rank information includes information items, such as "rank" and "serviceable failure". The "rank" is information indicating the level of competence with respect to maintenance work, for example. The "serviceable failure" indicates the names of one or more serviceable failures for which maintenance work and repair work can be effectively performed.

For example, the serviceable failures for rank "A" include "failure A, failure B, failure C, and failure D". This means that a CE indicated as rank "A" is capable of performing maintenance work and repair work with respect to failure A, failure B, failure C, and failure D that has occurred or is expected to occur in the device 20. That is, the CE indicated as rank "A" is capable of handling or responding to failure A, failure B, failure C, and failure D of the device 20.

The serviceable failures for rank "B" include "failure A, failure B, and failure C". This means that a CE indicated as rank "B" is capable of performing maintenance work and repair work with respect to failure A, failure B, and failure C that has occurred or is expected to occur in the device 20. That is, the CE indicated as rank "B" is capable of handling or responding to failure A, failure B, and failure C of the device 20.

As described above, the management apparatus 10 according to the third embodiment stores and manages information indicating the competence of the CE with respect to maintenance work and repair work. In other words, the management apparatus 10 according to the present embodiment stores and manages, with respect to each CE, capability information indicating the capability of the CE in handling or responding to a failure of the device 20.

<Process>

In the following, process operations of the device management system according to the third embodiment are described with reference to FIG. 22. FIG. 22 is a flowchart illustrating an example dispatch notification process according to the third embodiment.

In step S901, the failure prediction unit 51 of the management apparatus 10 predicts the occurrence of a failure in the device 20 based on the device state information acquired from the device 20 and the failure prediction model stored in the failure prediction model storage unit 61.

That is, for example, when the failure prediction unit 51 acquires device state information from the device 20 with the device ID "MFP001", the failure prediction unit 51 may predict the occurrence of failure A in the device 20 based on the acquired device state information and the failure prediction model A for predicting the occurrence of failure A. Similarly, the failure prediction unit 51 may predict the occurrence of failure B in the device 20 based on the acquired device state information and the failure prediction model B for predicting the occurrence of a failure B, for example. In this way, the failure prediction unit 51 predicts the occurrence of a failure in the device 20 based on each failure prediction model stored in the failure prediction model storage unit 61.

In the following descriptions, it is assumed that the failure prediction unit 51 has predicted in step S901 that failure C is likely to occur in the device 20 with the device ID "MFP001".

In step S902, the failure identification unit 52 of the management apparatus 10 generates failure information of the failure predicted by the failure prediction unit 51.

That is, the failure identification unit 52 acquires from the correspondence information, the failure cause, the required parts, and the estimated work time associated with the failure name of the failure predicted by the failure prediction unit 51. The failure identification unit 52 also acquires from the device information, the client name of the client operating the client environment in which the device 20 is installed and the location of the device 20. Then, the failure identification unit 52 generates the failure information based on the acquired information including the failure name, the failure cause, the required parts, the client name, and the location.

More specifically, the failure identification unit 52 acquires from the correspondence information, the corresponding failure cause, the required part "part C", and the estimated work time "0.5" stored in association with the failure name "failure C". Also, the failure identification unit 52 acquires from the device information, the client name "client A" and the location "$X_1$, $Y_1$" associated with the device 20 with the device ID "MFP001". Then, the failure identification unit 52 generates failure information as shown in FIG. 23, for example. FIG. 23 is a table illustrating an example of the failure information.

In this way, the failure identification unit 52 identifies the device 20 for which a failure has been predicted, the client name of the client operating the client environment in which the device 20 is installed, the location of the device 20, the failure name, the failure cause, the required parts, and the estimated work time for restoring the device 20, for example.

Then, in step S903, the CE determination process unit 53 of the management apparatus 10 determines a CE to be dispatched based on the failure information of FIG. 23, for example. Note that the process of determining the CE to be dispatched to the device 20 is described in detail below. In the following descriptions, it is assumed that a CE with the CE ID "CE001" has been determined to be the CE to be dispatched to the device 20.

Then, in step S904, the notification unit 57 of the management apparatus 10 sends a notification (dispatch request) to the terminal apparatus 30 at the call center for dispatching the CE determined by the CE determination process unit 53 to the device 20. That is, for example, the notification unit 57 sends a dispatch request including the CE information of the CE with the CE ID "CE001" identified by the CE determination process unit 53 and the failure information of FIG. 23 to the terminal apparatus 30 at the call center.

In turn, the terminal apparatus 30 at the call center may display a dispatch request screen 5000 as illustrated in FIG. 24, for example. FIG. 24 is a diagram illustrating an example dispatch request screen.

The dispatch request screen 5000 of FIG. 24 includes a display area 5001 displaying the device ID, the client name, the failure name, the failure cause, and the estimated work time for responding to the failure predicted to occur in the device 20. Also, the dispatch request screen 5000 includes a display area 5002 displaying the CE ID, the affiliated service station, the CE name, and the phone number of the CE to be dispatched to the device 20.

In this way, the operator at the call center may determine the CE to be dispatched based on the dispatch request screen 5000 displayed on the terminal apparatus 30.

Note that in the dispatch notification process of FIG. 22, a CE to be dispatched is determined when a failure in the device 20 is predicted in step S901. However, applications of the dispatch notification process for determining a CE to be dispatched are not limited to such a case.

For example, the dispatch notification process of FIG. 22 for determining a CE to be dispatched may be implemented in a case where the operator at the call center is notified by the client, via email or phone, of a failure that has occurred in the device 20, for example. In this case, the operator may send information, such as the failure name of the failure that has occurred in the device 20, to the management apparatus 10 via the terminal apparatus 30 at the call center, for example. In turn, the failure identification unit 52 of the management apparatus 10 may generate failure information based on the received information, and the CE determination process unit 53 may determine the CE to be dispatched to the device 20

Figure 25:
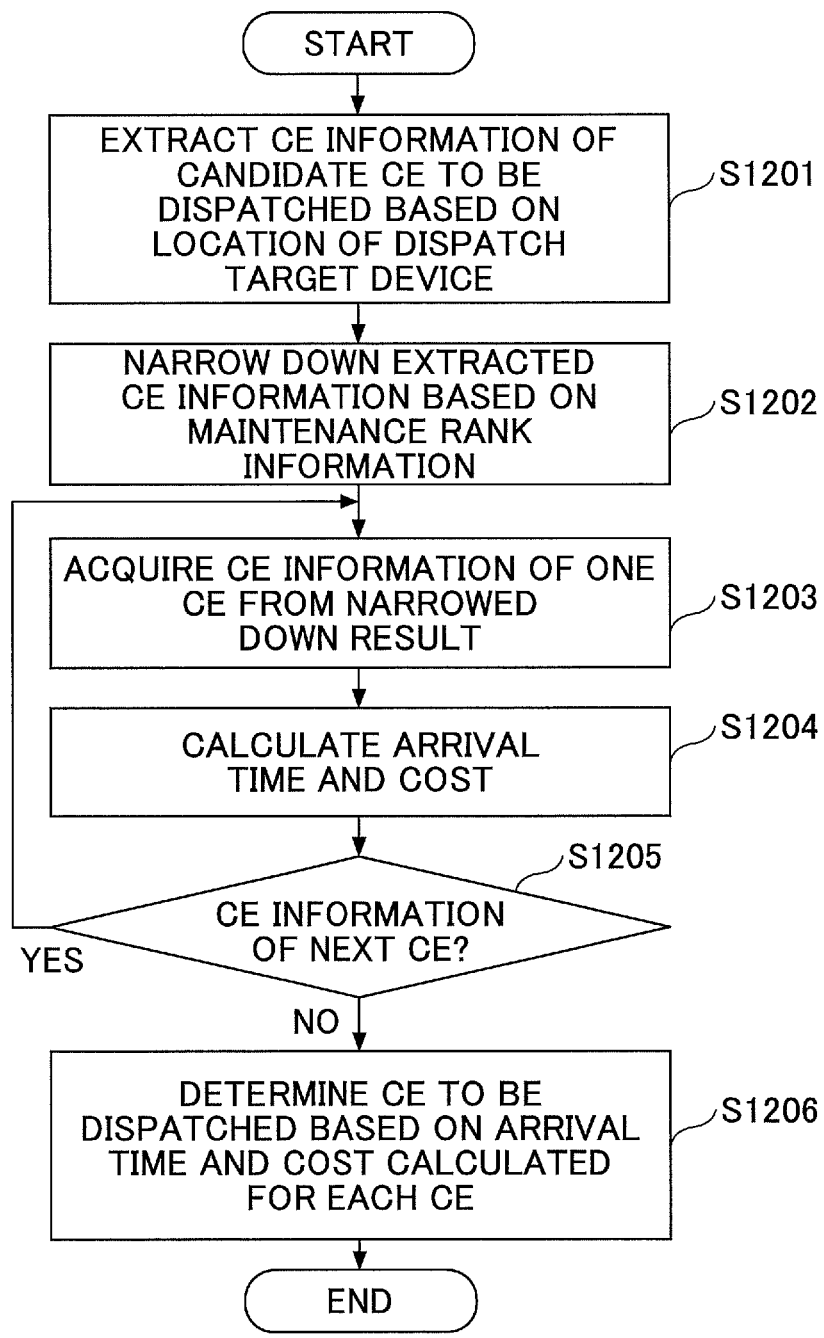
FIG. 25 is a flowchart illustrating an example CE determination process according to the third embodiment.

In the following, the CE determination process of step S903 of the dispatch notification process of FIG. 22 is described with reference to FIG. 25. FIG. 25 is a flowchart illustrating an example of the CE determination process according to the third embodiment.

In step S1201, the extraction unit 54 extracts from the CE information storage unit 64, CE information of candidate CEs to be dispatched to the device 20 for which a failure has been predicted based on the location of the device 20 included in the failure information generated for the device 20.

That is, the extraction unit 54 extracts from the CE information stored in the CE information storage unit 64, CE information of one or more CEs whose current position is within a predetermined range from the location "$X_1$, $Y_1$" of the device 20 to which a CE is to be dispatched (hereinafter referred to as "dispatch target device 20").

For example, as illustrated in FIG. 26A, the extraction unit 54 may extract from the CE information stored in the CE information storage unit 64, CE information of CEs with the CE IDs "CE001", "CE002", "CE004", and "CE005" that are currently located within the predetermined range from the location "$X_1$, $Y_1$" of the device 20.

In this way, the management apparatus 10 of the present embodiment first extracts the CE information of CEs currently located within a predetermined range from the dispatch target device (e.g., within a few kilometers from the dispatch target device 20). That is, the management apparatus 10 identifies one or more CEs that are within a certain distance from the dispatch target device 20.

Then, in step S1202, the extraction unit 54 narrows down the CEs extracted in step S1201 based on the failure information and the maintenance rank information. That is, the extraction unit 54 extracts CE information of a CE with the appropriate rank for handling the specific failure that has been predicted to occur in the device 20.

For example, if the specific failure that has occurred or is expected to occur in the dispatch target device 20 is "failure C", the extraction unit 54 refers to the maintenance rank information to determine that a CE with a rank of "A" or "B" needs to be dispatched to handle "failure" C. Thus, as illustrated in FIG. 26B, the extraction unit 54 may extract the CE information of CEs with the CE IDs "CE001" and "CE005" from the CE information of "CE001", "CE002", "CE004", and "CE005" of FIG. 26A. Also, in some embodiments, the maintenance rank information may include information on the ability to implement various measures in response to a failure, and the extraction unit 54 may determine a corresponding rank for having a given measure X implemented in response to failure C and extract CE information of a CE with the corresponding rank, for example.

As described above, the management apparatus 10 of the present embodiment narrows down the CE information extracted based on the current position of the CEs by extracting CE information of a CE that is capable of handling or responding to a failure that has occurred or is expected to occur in the dispatch target device 20 (i.e., capable of performing maintenance work or repair work for the failure). In this way, the management apparatus 10 can determine a CE that is capable of performing maintenance work or repair work on the device 20 from among the CEs located within a predetermined distance from the dispatch target device 20.

Note that although the extraction unit 54 of the present embodiment narrows down the CE information based on the corresponding ranks of the CEs, embodiments of the present invention are not limited thereto. For example, the CE information may be extracted based on various information relating to the capability of the CEs, such as maintenance work experience, maintenance training, and license and/or qualifications, for example.

Then, in step S1203, the calculation unit 55 acquires CE information of one CE included in the CE information narrowed down in step S1202.

Then, in step 1204, the calculation unit 55 calculates the arrival time and the required cost for dispatching the CE.

Figure 27:
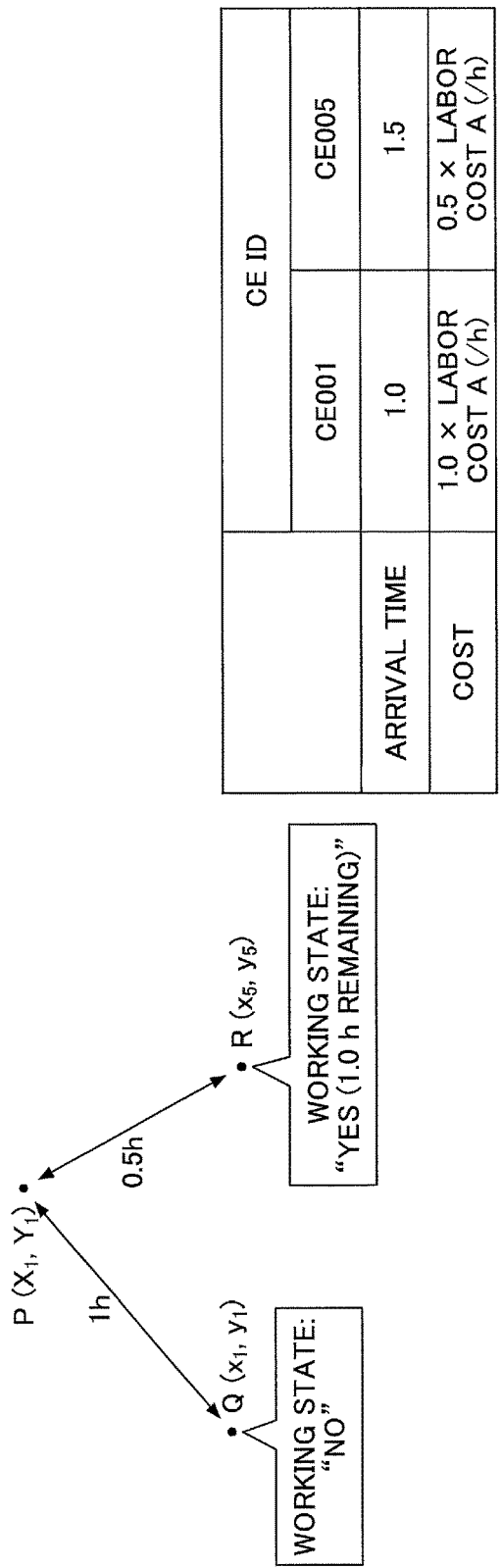
FIG. 27 is a diagram illustrating an example calculation result of an arrival time and a cost for dispatching a CE.

In the following, the calculation of the arrival time and the required cost for dispatching a CE is described with reference to FIG. 27. FIG. 27 is a diagram showing an example calculation of the arrival time and the required cost.

In the example of FIG. 27, it is assumed that point $P(X_1, Y_1)$ represents the location of the dispatch target device 20, point $Q(x_1, y_1)$ represents the current position of the CE with the CE ID "CE001", and point $R(x_5, y_5)$ represents the current position of the CE with the CE ID "CE005". It is also assumed that the estimated travel time from point Q to the point P is 1.0 hour, and the estimated travel time from point R to point P is 0.5 hours.

Further, the CE with the CE ID "CE001" is currently not engaged in maintenance work and can be dispatched immediately to the device 20. Thus, the arrival time of the CE with the CE ID "CE001" is calculated as "1.0" (hour) by the calculation unit 55.

On the other hand, the CE with the CE ID "CE005" is currently engaged in other maintenance work and is expected to be finished in 1.0 hour. Thus, the arrival time of the CE with the CE ID "CE005" is calculated by the calculation unit 55 as "1.5" (hours) by adding 1.0 and 0.5.

The required cost for dispatching the CE to the device 20 is calculated by the calculation unit 52 by multiplying the labor cost (per hour) of the CE by the estimated travel time of the CE. For example, the required cost for dispatching the CE with the CEID "CE001" to the device 20 may be calculated by the calculation unit 55 as "1.0× labor cost A". Note that labor cost A represents the labor cost per hour of the CE.

On the other hand, the required cost for dispatching the CE with the CE ID "CE005" may be calculated by the calculation unit 55 as "0.5× labor cost A".

As described above, the management apparatus 10 of the present embodiment calculates the arrival time and the required cost with respect to each CE included in the CE information narrowed down in step S1202.

In step S1205, the calculation unit 55 determines whether there is a next CE included in the CE information narrowed down in step S1202.

If it is determined in step S1205 that there is a next CE include in the CE information, the calculation unit 55 returns to step S1203. That is, the calculation unit 55 acquires from the CE information narrowed down in step S1203 the CE information of the next CE.

If it is determined in step S1205 that there is no next CE included in the CE information, in step S1206, the CE determination unit 56 determines the CE to be dispatched to the dispatch target device 20 based on the arrival time and the required cost calculated by the calculation unit 55.

Note that the CE to be dispatched may be determined based on a downtime minimization method, a cost minimization method, or a downtime-cost combination method, for example.

In the downtime minimization method, the CE determination unit 56 may determine the CE with the minimum arrival time calculated by the calculation unit 55 as the CE to be dispatched. For example, in the downtime minimization method, the CE determination unit 56 may identify the CE with the CE ID "CE001" from the CE information of FIG. 26B as the CE to be dispatched.

In the cost minimization method, the CE determination unit 16 may determine the CE with the minimum required cost calculated by the calculation unit 55 as the CE to be dispatched. For example, in the cost minimization method, the CE determination unit 56 may identify the CE with the CE ID "CE005" from the CE information of FIG. 26B as the CE to be dispatched.

In the downtime-cost combination method, for example, the CE determination unit 56 may determine the CE with the minimum required cost from among the CEs with calculated arrival times below a predetermined time, or a CE with the minimum calculated arrival time from among the CEs with required costs below a predetermined value as the CE to be dispatched.

As described above, in the device management system according to the present embodiment, a CE to be dispatched to the dispatch target device 20 is determined. Moreover, in the device management system of the present embodiment, the CE to be dispatched to the dispatch target device 20 is determined based on the location of the device 20, the current position of CEs, the predicted failure, and the capability of the CEs, for example.

Accordingly, in the device management system of the present embodiment, a CE that can arrive at the site of the dispatch target device 20 within an acceptable time and is capable of handling the specific failure that has occurred or is predicted to occur in the dispatch target device 20 may be dispatched to the dispatch target device 20.

Fourth Embodiment

In the following, the device management system according to a fourth embodiment of the present invention is described. Note that in the descriptions below, elements and features of the fourth embodiment that correspond to or are substantially identical to those of the third embodiment are given the same reference numerals and their descriptions will be omitted.

In the present embodiment, the arrival time and the required cost for dispatching a CE to handle a failure predicted to occur in a device 20 are calculated in consideration of the parts necessary for performing maintenance work on the device 20. Note that in the following descriptions, the arrival time and the required cost described above in connection with the third embodiment are respectively referred to as "first arrival time" and "first cost".

<Functional Configuration>

Figure 28:
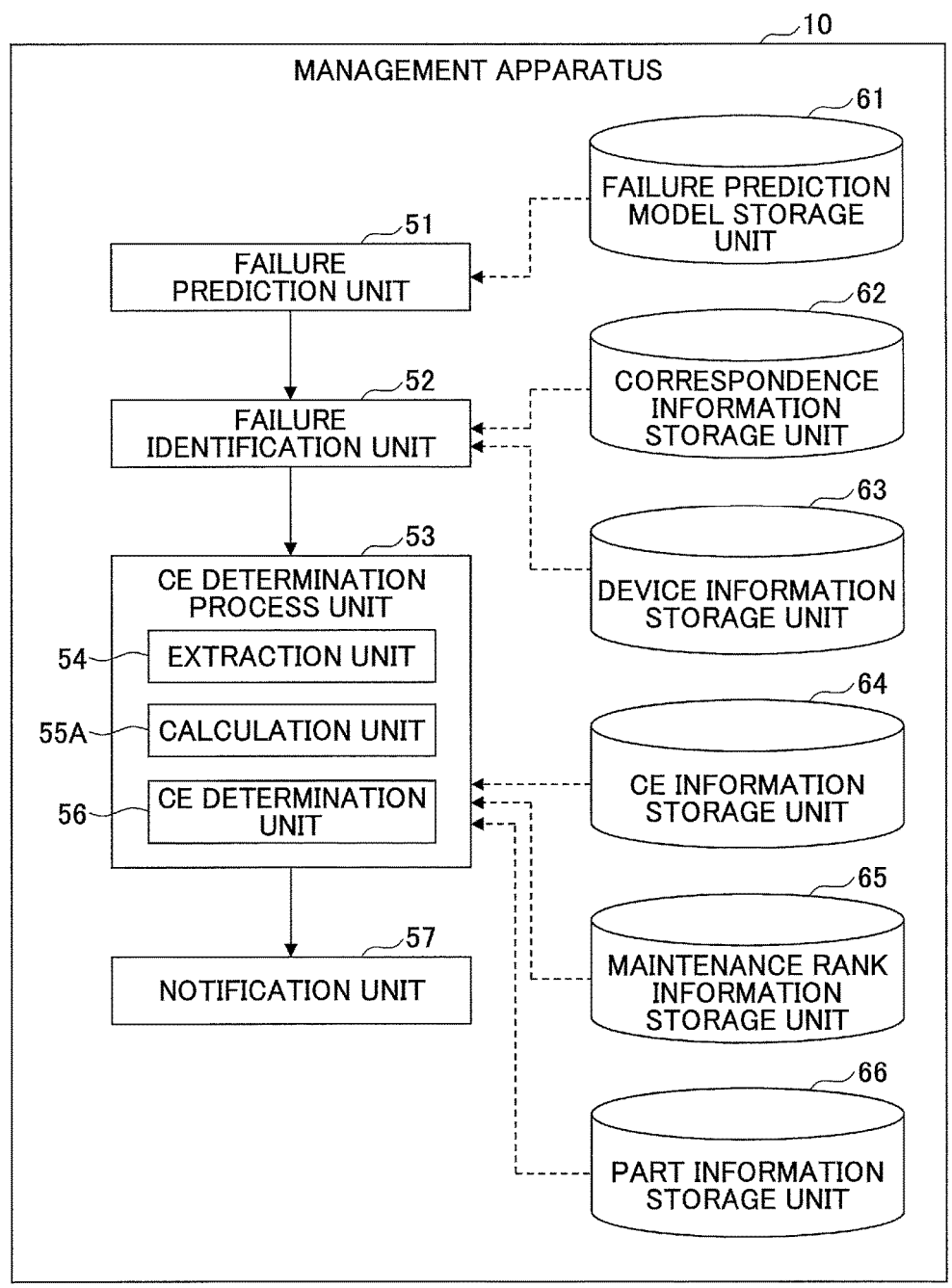
FIG. 28 is a block diagram illustrating an example functional configuration of the management apparatus according to a fourth embodiment of the present invention.

In the following, the functional configuration of the management apparatus 10 included in the device management system according to the fourth embodiment is described with reference to FIG. 28. FIG. 28 is a block diagram illustrating an example functional configuration of the management apparatus 10 according to the fourth embodiment.

The CE determination process unit 53 of the management apparatus 10 of the present embodiment includes a calculation unit 55A. Further, the management apparatus 10 of the present embodiment includes a part information storage unit 66. The part information storage unit 66 may be implemented by the HDD 108 of the management apparatus 10, or a storage device connected to the management apparatus 10 via the network N, for example.

The calculation unit 55A determines whether a CE has the required parts for performing necessary maintenance work on the dispatch target device 20. If it is determined that the CE has the required parts, the calculation unit 55A calculates the first arrival time and the first cost for dispatching the CE in the manner described above with reference to the third embodiment. On the other hand, if it is determined that the CE does not have the required parts, the calculation unit 55A calculates the arrival time and the required cost taking into account the time and cost for acquiring the required parts.

The part information storage unit 66 stores part information including information on each component part of the device 20, such as the CE having the part, and the service station or a parts center having inventory of the part, for example. Note that the parts center is a warehouse or the like that stores the parts of the device 20.

In the following, the part information stored in the part information storage unit 66 is described with reference to FIG. 29. FIG. 29 is a table illustrating an example of the part information.

As illustrated in FIG. 29, the part information includes information items, such as "part name", "CE with part", "service station with part", and "parts center inventory". The "part name" indicates the name of a component part of the device 20. The "CE with part" indicates the CE IDs of CEs that are in possession of the part. The "service station with part" indicates the names of the service stations having inventory of the part. The "parts center inventory" indicates whether the parts center has inventory of the part.

As described above, the management apparatus 10 of the present embodiment manages information on the CE in possession of the parts of the device 20 and locations such as the service stations and the parts center having inventory of the parts. In this way, the management apparatus 10 of the present embodiment can determine whether a CE has the required parts to be used for performing maintenance work or repair work on the device 20, and obtain information on locations where the parts can be obtained if the CE does not have the required parts.

<Process>

Figure 30:
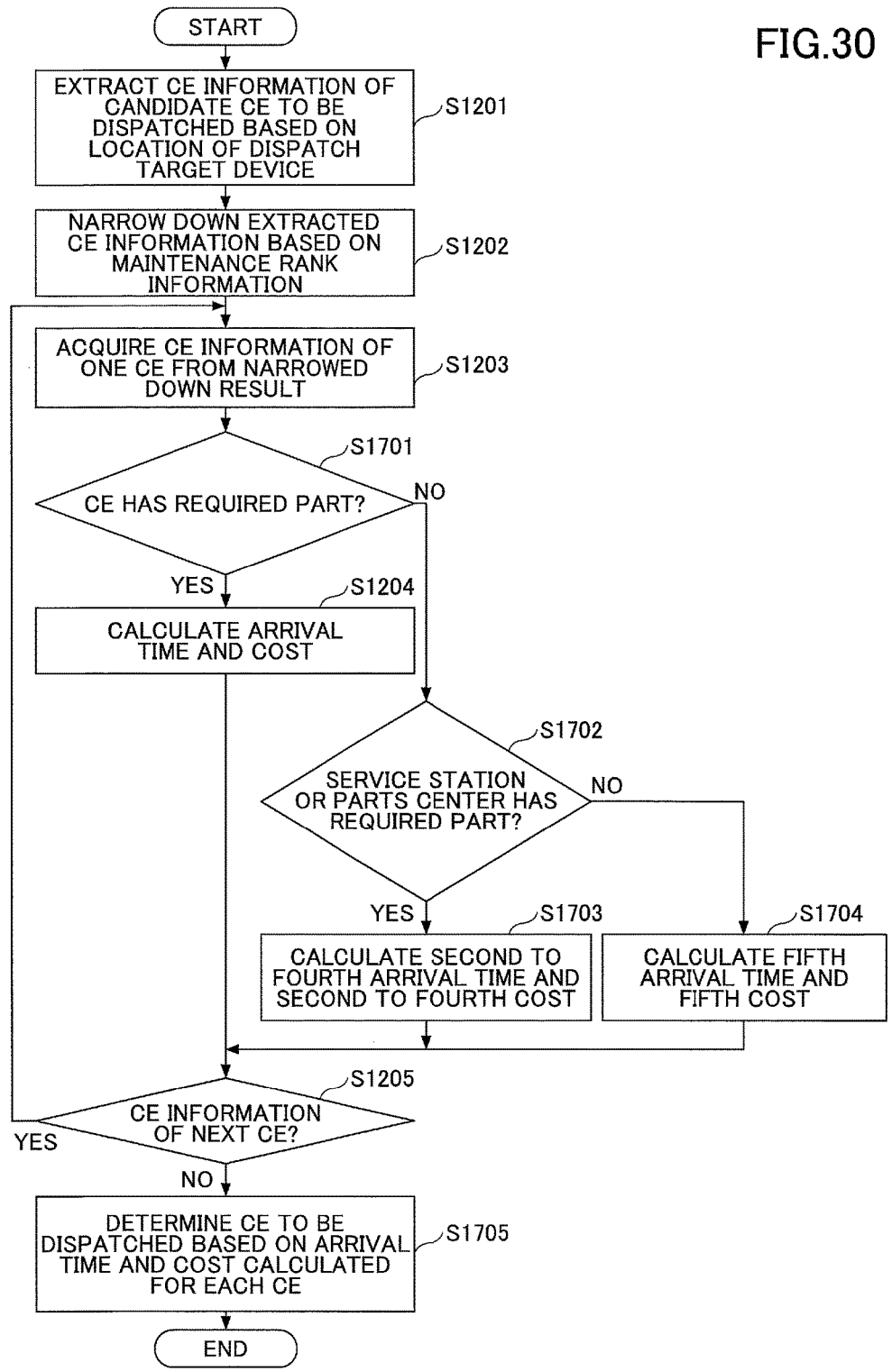
FIG. 30 is a flowchart illustrating a CE determination process according to the fourth embodiment.

In the following, process operations of the device management system according to the fourth embodiment are described with reference to FIG. 30. FIG. 30 is a flowchart illustrating an example of the CE determination process according to the fourth embodiment.

In step S1701, the calculation unit 55A of the management apparatus 10 refers to the part information to determine whether the CE identified in the CE information acquired in step S1203 is in possession of the part required for performing maintenance work on the dispatch target device 20.

If it is determined in step S1701 that the CE has the part required for maintenance of the dispatch target device 20, the calculation unit 55A proceeds to step S1204. That is, in this case, the calculation unit 55A calculates the first arrival time and the first cost for dispatching the CE as described above in connection with the third embodiment. Note that in this case, the calculation unit 55A does not perform the process steps of calculating second through fifth arrival times and second through fifth costs (described below) for dispatching the CE.

For example, referring to the CE information of FIG. 26B, it can be appreciated that the CE with the CE ID "CE001" is in possession of the part "part C" required for performing maintenance work on the device 20. Therefore, the calculation unit 55A does not calculate the second through fifth arrival times and the second through fifth costs for dispatching the CE with the CE ID "CE001".

If it is determined in step S1701 that the CE is not in possession of the part required for maintenance of the dispatch target device 20, the calculation unit 55A determines whether the service station with which the CE is affiliated or the parts center has inventory of the required part.

If it is determined in step S1702 that the service station or the parts center has inventory of the required part, the calculation unit 55A calculates the second through fourth arrival times and the second through fourth costs for dispatching the CE (step S1703). Note that calculation methods for calculating the second through fourth arrival times and the second through fourth costs are described below.

If it is determined in step S1702 that there is no inventory of the required part in the service stations or the parts center, the calculation unit 55A calculates the fifth arrival time and the fifth cost for dispatching the CE (step S1704).

Figure 31:
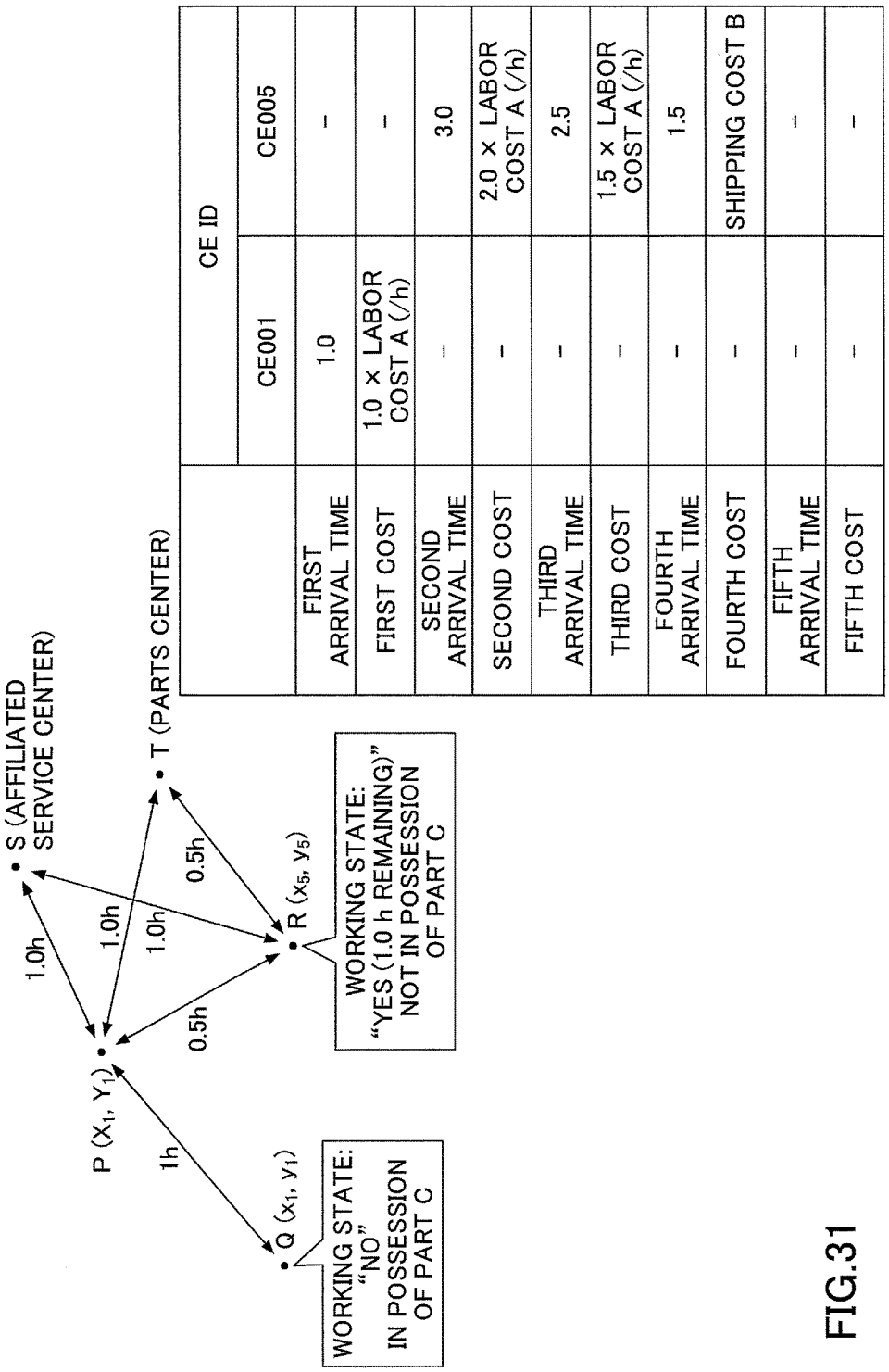
FIG. 31 is a diagram illustrating another example calculation result of the arrival time and the cost for dispatching a CE.

In the following, calculation of the first through fifth arrival times and the first through fifth costs is described with reference to FIG. 31. FIG. 31 is a diagram illustrating another example calculation result of the arrival time and cost. Note that the first arrival time and the first cost are similar to the arrival time and the cost described above in connection with the third embodiment, and as such, descriptions thereof will be omitted.

The second arrival time and the second cost correspond to the arrival time and the cost required for having the CE stop by at the service station or the parts center to acquire the required part and then go to the dispatch target device 20. In the example of FIG. 31, it is assumed that the estimated travel time from point R ($x_5$, $y_5$) corresponding to the current position of the CE with the CE ID "CE005" to point S corresponding to the location of the service station is 1.0 hour, and the estimated travel time from point S to point P($X_1$, $Y_1$) corresponding to the location of the device 20 is 1.0 hour.

In this case, the calculation unit 55A calculates the second arrival time of the CE with the CE ID "CE005" as "3.0" (hours) by adding the remaining time required for the CE to complete his current work (1.0 hour) and the estimated travel time for the CE to reach the device 20 via the service station (2.0 hours). The calculation unit 55A calculates the second cost for dispatching the CE with the CE ID "CE005" as "2.0× labor cost A" by multiplying the labor cost A by the estimated travel time.

The third arrival time and the third cost correspond to the arrival time and the cost for having the CE to stop by at the parts center to acquire the part required for maintenance work and then go to the dispatch target device 20. In the example of FIG. 31, it is assumed that the estimated travel time from point R ($x_5$, $y_5$) corresponding to the current position of the CE with the CE ID "CE005" to point T corresponding to the location of the parts center is 0.5 hours, and the estimated travel time from point T to point P($X_1$, $Y_1$) corresponding to the location of the device 20 is 1.0 hour.

In this case, the calculation unit 55A calculates the third arrival time for the CE with the CE ID "CE005" as "2.5" by adding the remaining time required for the CE to complete his current work (1.0 hour) and the estimated travel time for the CE to get to the device 20 via the parts center (1.5 hours). The calculation unit 55A calculates the third cost for dispatching the CE as "1.5× labor cost A" by multiplying the labor cost A by the estimated travel time.

The fourth arrival time and the fourth the cost correspond to the arrival time and cost in a case where the CE goes directly to the dispatch target device 20 while arrangements are made to have the part required for maintenance work delivered to the location of the device 20 by courier, such as a bike courier. In the example of FIG. 31, it is assumed that the estimated travel time from point R ($x_5$, $y_5$) corresponding to the current position of the CE with the CE ID "CE005" to point P($X_1$, $Y_1$) corresponding to the location of the device 20 is 0.5 hours.

In this case, the calculation unit 55A calculates the fourth arrival time of the CE with the CE ID "CE005" as "1.5" (hours) by adding the remaining time required for the CE to complete his current work (1.0 hour) and the estimated travel time to reach the device 20 (0.5 hours). As the fourth cost, the calculation unit 55A may calculate the "shipping cost B" for delivering the required part, to the device 20 by courier, for example.

The fifth arrival time and the fifth cost correspond to the arrival time and the cost in the case where there is no inventory of the required part at the service station or the parts center. In this case, the time and cost required for having the required part delivered from the manufacturer, for example, may be calculated as the fifth arrival time and the fifth cost.

For example, if it takes one day to have the required part delivered, the fifth arrival time may be "24.0" (hours). The fifth cost in this case may be the price of the part, for example.

Then, if it is determined in step S1205 that there is no next CE included in the CE information narrowed down in step S1202, the CE determination unit 56 determines the CE to be dispatched to the dispatch target device 20 based on the first through fifth arrival times and the first through fifth costs calculated by the calculation unit 55A (step S1705). Note that the determination methods described above in connection with the third embodiment, such as the downtime minimization method, the cost minimization method, or the downtime-cost combination method may be used to determine the CE to be dispatched, for example.

That is, in the downtime minimization method, the CE with the minimum arrival time among the first through fifth arrival times calculated by the calculation unit 15A may be determined as the CE to be dispatched.

In the cost minimization method, the CE with the minimum cost among the first through fifth costs calculated by the calculation unit 55A may be determined as the CE to be dispatched.

In the downtime-cost combination method, for example, the CE with the minimum cost from among the CEs with first through fifth arrival times below a predetermined time may be determined as the CE to be dispatched, or the CE with the minimum arrival time from among the CEs with first through fifth costs below a predetermined value may be determined as the CE to be dispatched.

As described above, in the device management system of the present embodiment, the CE to be dispatched to the dispatch target device 20 is determined based on whether the CE has the part required for performing maintenance work on the dispatch target device 20. Further, in the management system of the present embodiment, when it is determined that the CE does not have the required part, the CE to be dispatched is determined taking into account the time and cost required to obtain the part.

Thus, in the device management system according to the present embodiment, an appropriate CE may be dispatched taking into account the part required for maintenance of the dispatch target device 20.

Fifth Embodiment

In the following, the device management system according to a fifth embodiment of the present invention is described. Note that in the descriptions below, elements and features of the fifth embodiment that correspond to or are substantially identical to those of the fourth embodiment are given the same reference numerals and their descriptions will be omitted.

According to an aspect of the present embodiment, a CE to be dispatched to a dispatch target device 20 is determined based on the user (client) using the dispatch target device 20.

<Functional Configuration>

Figure 32:
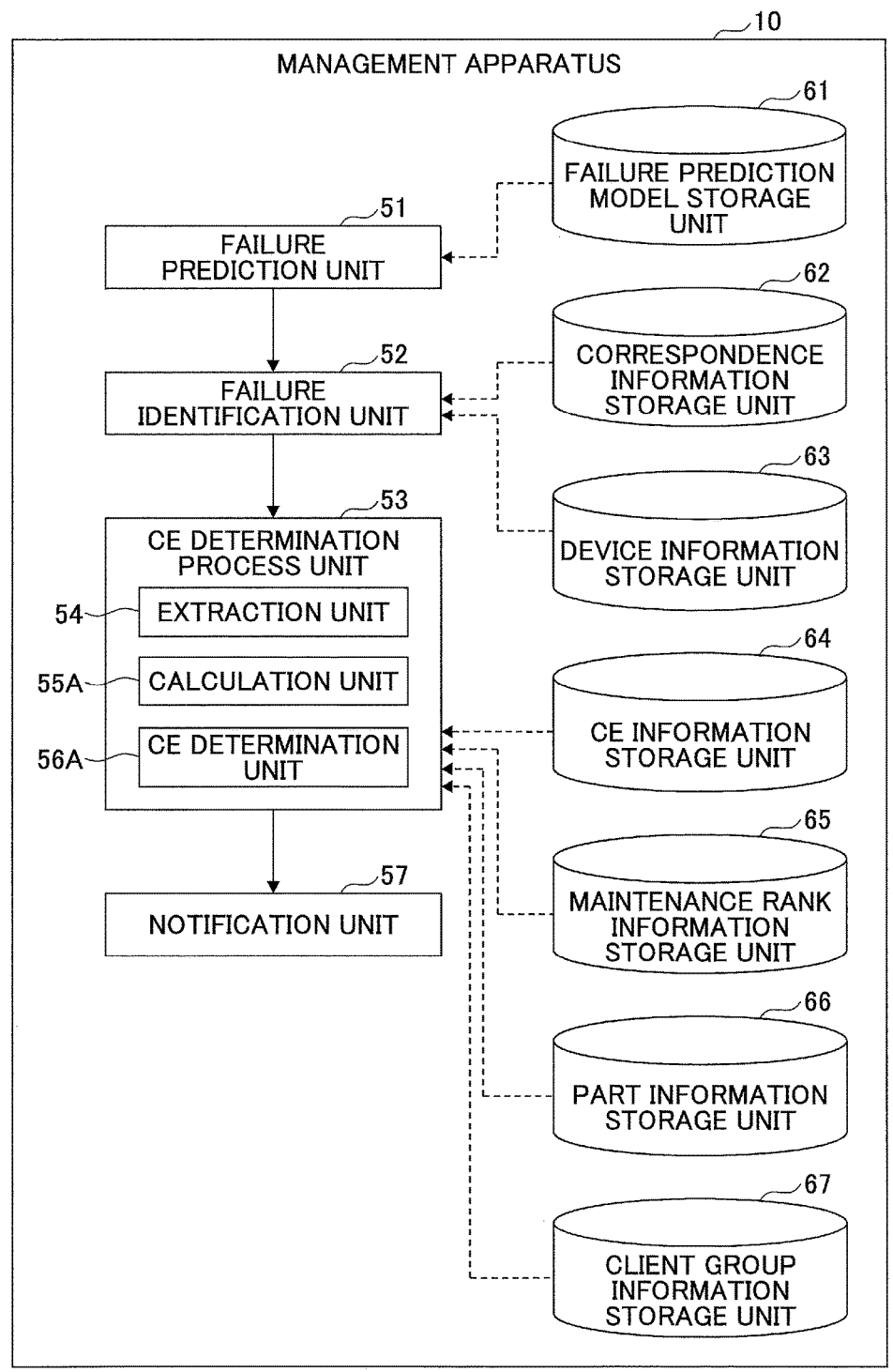
FIG. 32 is a block diagram illustrating an example functional configuration of the management apparatus according to a fifth embodiment of the present invention.

In the following, the functional configuration of the management apparatus 10 included in the device management system according to the fifth embodiment is described with reference to FIG. 32. FIG. 32 is a block diagram illustrating an example functional configuration of the management apparatus 10 according to the fifth embodiment.

The CE determination process unit 53 of the management apparatus 10 according to the present embodiment includes a CE determination unit 56A. Also, the management apparatus 10 of the present embodiment includes a client group information storage unit 67. The client group information storage unit 67 may be implemented by the HDD 108 of the management apparatus 10 or a storage device connected the management apparatus 10 via the network N, for example.

Based on client group information stored in the client group information storage unit 67, the CE determination unit 56A determines whether to use the downtime minimization method, the cost minimization method, or the downtime-cost combination method, for example, in determining the CE to be dispatched to the dispatch target device 20.

The client group information storage unit 67 stores and manages the client group information associating each client with a corresponding group.

In the following, the client group information stored in the client group information storage unit 67 is described with reference to FIG. 33. FIG. 33 is a table illustrating an example of the client group information.

As illustrated in FIG. 33, the client group information includes information items, such as "client name" and "group". The "client name" indicates the name of the client corresponding to the user of the device 20. The "group" indicates the group to which the client belongs.

Note that the group to which a client belongs may be determined, for example, based on the terms of a contract signed with the client. More specifically, for example, a client that has entered into a normal maintenance contract for the device 20 may belong to "group A", whereas a client that has entered into a special maintenance contract in addition to the normal maintenance contract for the device 20 may belong to "group B". However, the manner of determining the corresponding group of a client is not limited to the above example. For example, the corresponding group of a client may be determined based on the region in which the office of the client is located, or the number of times a failure has occurred in the device 20 installed in the client environment.

As described above, the management apparatus 10 of the present embodiment classifies clients (users) using the devices 20 into a plurality of different groups. In this way, the management apparatus 10 of the present embodiment may determine the CE to be dispatched to a dispatch target device 20 using a corresponding CE determination method according to the group to which the client using the dispatch target device 20 belongs, for example.

<Process>

Figure 34:
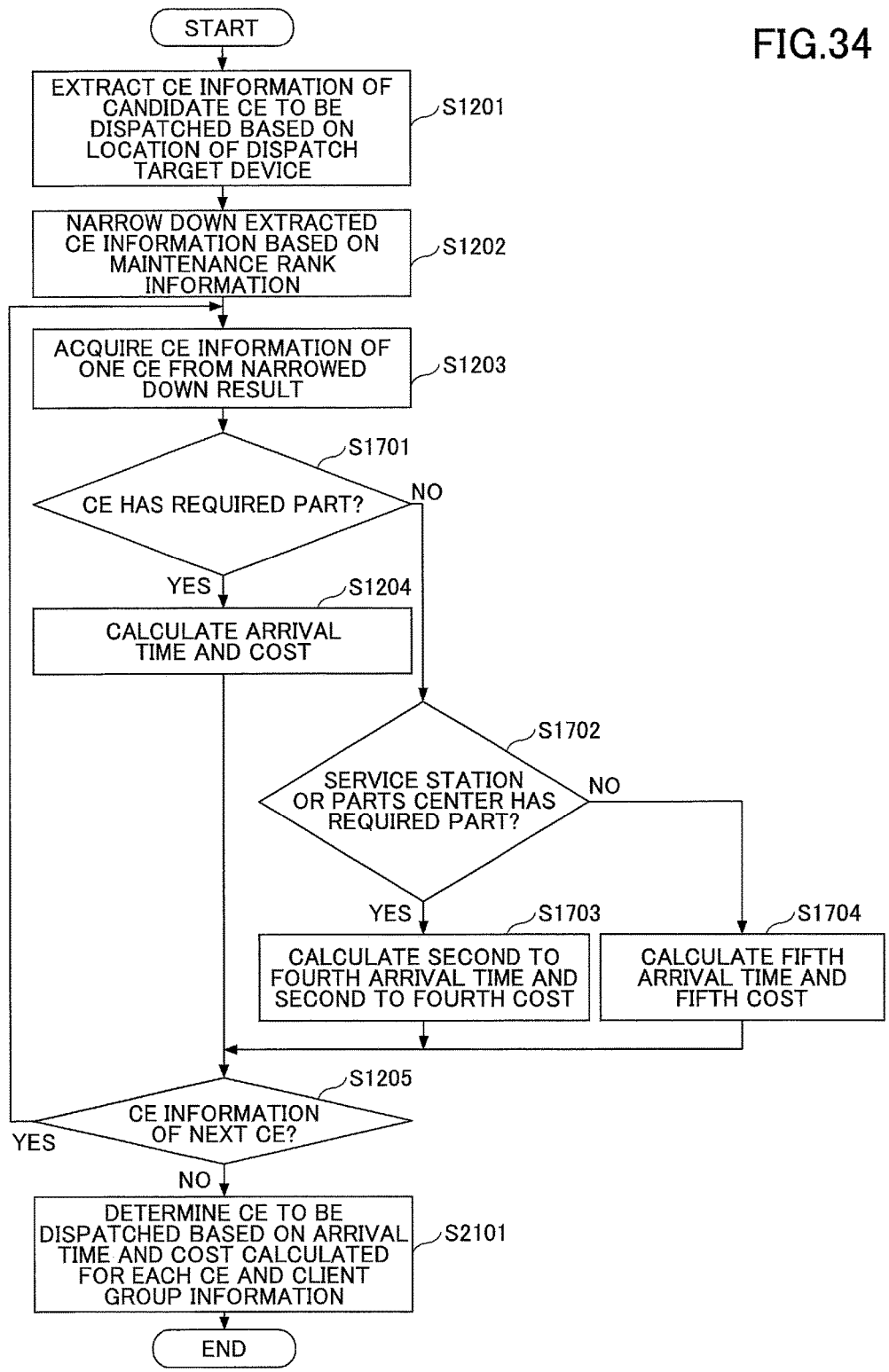
FIG. 34 is a flowchart illustrating the CE determination process according to the fifth embodiment.

In the following, process operations of the device management system according to the fifth embodiment are described with reference to FIG. 34. FIG. 34 is a flowchart illustrating an example CE determination process according to the fifth embodiment.

In the present embodiment, if it is determined in step S1205 that there is no next CE included in the CE information narrowed down in step S1202, the CE determination unit 56A determines the CE to be dispatched to the dispatch target device 20 based on the first through fifth arrival times and the first through fifth costs calculated by the calculation unit 55A, and the client group information stored in the client group information storage unit 67 (step S2101).

For example, if the client using the dispatch target device 20 belongs to "group A", the CE determination unit 56A may determine the CE to be dispatched to the dispatch target device 20 using the cost minimization method.

Also, for example, if the client using the dispatch target device 20 belongs to "group B", the CE determination unit 56A may determine the CE to be dispatched to the dispatch target device 20 using the downtime minimization method.

Further, for example, if the client using the dispatch target device 20 belongs to "group C", the CE determination unit 56A may determine the CE to be dispatched to the dispatch target device 20 using the downtime-cost combination method.

As described above, in the device management system according to the present embodiment, the determination method to be used to determine a CE to be dispatched to a device 20 is determined based on information relating to the client using the device 20. That is, in the device management system according to the present embodiment, the determination method to be used to determine the CE to be dispatched may be determined based on various types of information relating to the client, such as the terms of the contract signed with the client using the device 20, the location of the client's office, and/or the number of failures or the failure rate of the device 20 used by the client, for example.

Although the present invention has been described above with reference to certain illustrative embodiments, the present invention is not limited to these embodiments, and numerous variations and modifications may be made without departing from the scope of the present invention.

What is claimed is:

1. An information processing system comprising:
   a first management unit configured to manage, with respect to one or more responders, capability information indicating an ability to respond to a failure of an electronic device and first position information indicating a current position of each responder among the one or more responders;
   a storage unit configured to store and associate a cause of the failure of the electronic device, state information of the electronic device at a time the failure occurred in the electronic device due to the cause of the failure, and a measure to be implemented in response to the cause of the failure; and
   at least one processor configured to execute an instruction stored in a memory to perform:
      an acquisition process for acquiring the state information of the electronic device,
      a failure identification process for generating failure information including device identification information that identifies the electronic device as a dispatch target device and generating failure identification information identifying the failure of the electronic device,
      a failure diagnosis process for determining the cause of the failure and determining the measure to be implemented in response to the cause of the failure based on the acquired state information of the electronic device,
      a responder determination process for determining a responder to be dispatched to the dispatch target device identified by the device identification information based on the failure identification information, the capability information, the first position information, and second position information of the dispatch target device that is determined based on the device identification information,
      a dispatch issuing process for issuing a dispatch request for dispatching the responder determined by the responder determination process to the dispatch target device identified by the device identification information,
      a failure diagnosis result notification process for notifying the responder of the cause of the failure that has occurred in the electronic device and the measure to be implemented in response to the cause of the failure that have been determined by the failure diagnosis process; and
      a first calculation process for calculating an arrival time required for each responder of the one or more responders to arrive at the dispatch target device based on the first position information and the second position information, wherein the responder determination process includes:
referring to the first position information of each responder,
extracting one or more responders that are positioned within a predetermined range with respect to the second position information,
identifying one responder from among the one or more extracted responders as the responder to be dispatched to the dispatch target device, and
determining, from among the one or more extracted responders, a responder with a minimum arrival time calculated by the first calculation process as the responder to be dispatched to the dispatch target device; and
in the case where the responder determination process determines that an accuracy of the failure diagnosis process in determining the cause of the failure and the measure to be implemented in response to the cause of the failure is below a predetermined rate, the responder determination process determines a skilled responder as the responder that is to respond to the failure that has occurred in the electronic device.

2. The information processing system according to claim 1, wherein
even when the responder determination process determines that the accuracy of the determination, by the failure diagnosis process, of the cause of the failure that has occurred in the electronic device and the measure to be implemented in response to the cause of the failure is higher than the predetermined rate, if the measure to be implemented in response to the cause of the failure is difficult, the responder determination process determines the skilled responder as the responder that is to respond to the failure that has occurred in the electronic device.

3. The information processing system according to claim 1, wherein
the failure diagnosis process determines a part required for restoring the electronic device from the failure that has occurred in the electronic device; and
the responder determination process determines a responder that is in possession of the part required for restoring the electronic device.

4. The information processing system according to claim 1, wherein
the responder determination process determines a responder that is close to an installation location of the electronic device in which the failure has occurred.

5. The information processing system according to claim 1, wherein
the failure diagnosis process determines a part required for restoring the electronic device from the failure that has occurred in the electronic device; and
the at least one processor is further configured to perform a part ordering process for ordering the part required for restoring the electronic device.

6. The information processing system according to claim 1, wherein
the at least one processor is further configured to perform a failure diagnosis model development process for developing a failure diagnosis model based on maintenance history information, the failure diagnosis model representing the association between the cause of the failure that has occurred in an electronic device, the state information of the electronic device at the time the failure has occurred in the electronic device due to the cause of the failure, and the measure to be implemented in response to the cause of the failure; and
the failure diagnosis model development process receives information indicating whether the determination, by the failure diagnosis process, of the cause of the failure that has occurred in the electronic device and the measure to be implemented in response to the cause of the failure was accurate, and reflects the received information in the failure diagnosis model.

7. The information processing system according to claim 6, wherein the failure diagnosis model development process develops the failure diagnosis model by
analyzing from the maintenance history information one or more causes of the failure,
searching and identifying, with respect to each of the causes of the failure analyzed, a characteristic of the state information of the electronic device that commonly occurs before the occurrence of the failure; and
analyzing from the maintenance history information a measure required for restoring the electronic device from the failure with respect to each of the causes of the failure analyzed.

8. The information processing system according to claim 1, wherein
the state information of the electronic device includes at least one of information relating to an output value of a sensor included in the electronic device and information relating to a consumption degree of a consumable part of the electronic device.

9. The information processing system according to claim 1, further comprising:
a second management unit configured to manage the capability information in association with corresponding failure identification information of one or more failures that can be handled.

10. The information processing system according to claim 1, wherein
the at least one processor is further configured to perform a second calculation process for calculating a cost required for dispatching each of the one or more responders to the dispatch target device; and
the responder determination process determines a responder with a minimum cost calculated by the second calculation process, from among the one or more responders extracted, as the responder to be dispatched to the dispatch target device.

11. The information processing system according to claim 1, wherein
the failure identification information included in the failure information corresponds to information identifying a failure that has occurred in the electronic device or a failure that is predicted to occur in the electronic device.

12. The information processing system according to claim 1, wherein
the capability information managed by the first management unit includes information indicating an ability to implement the measure for responding to the cause of the failure; and
the responder determination process determines a responder that is capable of implementing the measure for responding to the cause of the failure determined by the failure diagnosis process as the responder to be dispatched to the dispatch target device.

13. A failure diagnosis method implemented by an information processing system including at least one information processing apparatus, the failure diagnosis method comprising steps of:
managing, with respect to one or more responders, capability information indicating an ability to respond to a failure of an electronic device and first position information indicating a current position of each responder among the one or more responders;
storing and associating a cause of the failure of the electronic device, state information of the electronic device at a time the failure occurred in the electronic device due to the cause of the failure, and a measure to be implemented in response to the cause of the failure;
acquiring the state information of the electronic device;
generating failure information including device identification information identifying the electronic device as a dispatch target device and failure identification information identifying the failure of the electronic device;
determining the cause of the failure and determining the measure to be implemented in response to the cause of the failure based on the acquired state information of the electronic device;
determining a responder to be dispatched to the dispatch target device identified by the device identification information based on the failure identification information, the capability information, the first position information, and second position information of the dispatch target device that is determined based on the device identification information;
issuing a dispatch request for dispatching the responder determined by the responder determination process to the dispatch target device identified by the device identification information;
notifying the responder of the cause of the failure that has occurred in the electronic device and the measure to be implemented in response to the cause of the failure that have been determined by the failure diagnosis process; and
calculating an arrival time required for each responder of the one or more responders to arrive at the dispatch target device based on the first position information and the second position information,
wherein the determining of the responder includes
referring to the first position information of each responder,
extracting one or more responders that are positioned within a predetermined range with respect to the second position information,
identifying one responder from among the one or more extracted responders as the responder to be dispatched to the dispatch target device, and
determining, from among the one or more extracted responders, a responder with a minimum arrival time calculated by the first calculation process as the responder to be dispatched to the dispatch target device; and
in the case where the responder determination process determines that an accuracy of the failure diagnosis process in determining the cause of the failure and the measure to be implemented in response to the cause of the failure is below a predetermined rate, the responder determination process determines a skilled responder as the responder that is to respond to the failure that has occurred in the electronic device.

14. A computer program product comprising a non-transitory computer-readable medium having a computer program recorded thereon that is executable by an information processing apparatus, the computer program, when executed, causing the information processing apparatus to perform steps of:
managing, with respect to one or more responders, capability information indicating an ability to respond to a failure of an electronic device and first position information indicating a current position of each responder among the one or more responders;
storing and associating a cause of the failure of the electronic device, state information of the electronic device at a time the failure occurred in the electronic device due to the cause of the failure, and a measure to be implemented in response to the cause of the failure;
acquiring the state information of the electronic device;
generating failure information including device identification information identifying the electronic device as a dispatch target device and failure identification information identifying the failure of the electronic device;
determining the cause of the failure and determining the measure to be implemented in response to the cause of the failure based on the acquired state information of the electronic device;
determining a responder to be dispatched to the dispatch target device identified by the device identification information based on the failure identification information, the capability information, the first position information, and second position information of the dispatch target device that is determined based on the device identification information;
issuing a dispatch request for dispatching the responder determined by the responder determination process to the dispatch target device identified by the device identification information;
notifying the responder of the cause of the failure that has occurred in the electronic device and the measure to be implemented in response to the cause of the failure that have been determined by the failure diagnosis process; and
calculating an arrival time required for each responder of the one or more responders to arrive at the dispatch target device based on the first position information and the second position information,
wherein the determining of the responder includes
referring to the first position information of each responder,
extracting one or more responders that are positioned within a predetermined range with respect to the second position information,
identifying one responder from among the one or more extracted responders as the responder to be dispatched to the dispatch target device, and
determining, from among the one or more extracted responders, a responder with a minimum arrival time calculated by the first calculation process as the responder to be dispatched to the dispatch target device; and
in the case where the responder determination process determines that an accuracy of the failure diagnosis process in determining the cause of the failure and the measure to be implemented in response to the cause of the failure is below a predetermined rate, the responder determination process determines a skilled responder as the responder that is to respond to the failure that has occurred in the electronic device.

* * * * *